US011791469B2

(12) United States Patent
Chen

(10) Patent No.: US 11,791,469 B2
(45) Date of Patent: Oct. 17, 2023

(54) MATERIALS AND METHODS FOR COMPONENTS OF LITHIUM BATTERIES

(71) Applicant: Lin Chen, Chicago, IL (US)

(72) Inventor: Lin Chen, Chicago, IL (US)

(73) Assignee: Shenzhen XWorld Technology Limited, Shenzhen (CN)

(*) Notice: Subject to any disclaimer, the term of this patent is extended or adjusted under 35 U.S.C. 154(b) by 173 days.

(21) Appl. No.: 16/433,944

(22) Filed: Jun. 6, 2019

(65) Prior Publication Data

US 2019/0379056 A1 Dec. 12, 2019

Related U.S. Application Data

(60) Provisional application No. 62/756,010, filed on Nov. 5, 2018, provisional application No. 62/728,744, filed on Sep. 7, 2018, provisional application No. 62/681,674, filed on Jun. 7, 2018.

(51) Int. Cl.
| | | |
|---|---|---|
| *H01M 4/62* | (2006.01) | |
| *H01M 10/0525* | (2010.01) | |
| *H01M 4/36* | (2006.01) | |
| *H01M 4/38* | (2006.01) | |
| *H01M 4/02* | (2006.01) | |

(52) U.S. Cl.
CPC ........... *H01M 4/628* (2013.01); *H01M 4/366* (2013.01); *H01M 4/38* (2013.01); *H01M 10/0525* (2013.01); *H01M 2004/027* (2013.01)

(58) Field of Classification Search
None
See application file for complete search history.

(56) References Cited

U.S. PATENT DOCUMENTS

| | | | |
|---|---|---|---|
| 5,314,765 A | 5/1994 | Bates | |
| 6,214,061 B1 | 4/2001 | Visco et al. | |
| 9,722,275 B2 | 8/2017 | Zhamu et al. | |
| 2001/0041294 A1* | 11/2001 | Chu | H01M 4/0438 |
| | | | 429/231.9 |
| 2002/0182488 A1 | 12/2002 | Cho et al. | |
| 2004/0253510 A1 | 12/2004 | Jonghe | |
| 2008/0057387 A1 | 3/2008 | Visco | |
| 2009/0280410 A1 | 11/2009 | Zaguib | |
| 2011/0206962 A1 | 8/2011 | Minami et al. | |
| 2014/0099556 A1 | 4/2014 | Johnson | |
| 2014/0220439 A1 | 8/2014 | Badding | |
| 2016/0072132 A1 | 3/2016 | Liao et al. | |
| 2016/0293943 A1 | 10/2016 | Hu et al. | |

(Continued)

FOREIGN PATENT DOCUMENTS

| | | |
|---|---|---|
| WO | 2019236898 | 12/2019 |
| WO | 2020176787 | 9/2020 |

OTHER PUBLICATIONS

Chen, L., et al., "Novel ALD Chemistry Enabled Low-Temperature Synthesis of Lithium Fluoride Coatings for Durable Lithium Anodes," ACS Appl. Mater. Interfaces, 2018, vol. 10, pp. 26972-26981.

(Continued)

*Primary Examiner* — Carmen V Lyles-Irving
(74) *Attorney, Agent, or Firm* — Neal, Gerber & Eisenberg LLP

(57) ABSTRACT

The present invention relates to materials and methods for components of lithium batteries, such as metal anodes having a protective coating.

19 Claims, 9 Drawing Sheets

(56) References Cited

U.S. PATENT DOCUMENTS

| | | | |
|---|---|---|---|
| 2016/0351878 A1 | 12/2016 | Visco | |
| 2016/0372743 A1 | 12/2016 | Cho et al. | |
| 2017/0263935 A1* | 9/2017 | Kozen | H01M 4/62 |
| 2017/0317352 A1 | 11/2017 | Lee | |
| 2017/0373321 A1 | 12/2017 | Skotheim | |
| 2018/0301693 A1* | 10/2018 | Choi | H01M 4/134 |
| 2018/0301707 A1 | 10/2018 | Pan | |
| 2019/0044151 A1 | 2/2019 | Elam et al. | |
| 2019/0051905 A1* | 2/2019 | Zhamu | H01M 4/525 |
| 2019/0058177 A1* | 2/2019 | Herle | H01G 11/84 |
| 2019/0115617 A1* | 4/2019 | Pan | H01M 4/366 |
| 2019/0198865 A1* | 6/2019 | Kim | H01M 4/628 |
| 2019/0393485 A1 | 12/2019 | He | |
| 2019/0393487 A1 | 12/2019 | Pan | |
| 2020/0136176 A1 | 4/2020 | Chen | |
| 2020/0161660 A1 | 5/2020 | Elam | |
| 2020/0358090 A1 | 11/2020 | Jang | |
| 2021/0043939 A1 | 2/2021 | Paris Escribano | |
| 2022/0131138 A1 | 4/2022 | Chen | |

OTHER PUBLICATIONS

Huang, B., et al., "Li-ion conduction and stability of perovskite $Li_{3/8}Sr_{7/16}Hf_{1/4}Ta_{3/4}O_3$," 2016. 8(23): p. 14552-14557.

Mashtalir, O., et al., "High-Purity Lithium Metal Films from Aqueous Mineral Solutions," ACS Omega, 2018, vol. 3, pp. 181-187.

Qian, J., et al., "Anode-Free Rechargeable Lithium Metal Batteries," Adv. Funct. Mater. 2016, vol. 26, pp. 7094-7102.

Sidrabe, "(2014) PVD Lithium Thin Foil: Li Web Coaters and Coating Processing Custom Samples and Batch Production Coating Equipment Engineering," [Brochure] 4 pages. Retrieved from https://www.sidrabe.com/assets/files/downloads/PVD_Lithium_Think_Foil.pdf.

Swisher, R., et al., (2002) "Web Coating with Lithium—Technical Solution for Metal Anode Structures in Li Batteries," 45th Annual Technical Conference Proceedings, pp. 535-538. Retrieved from https://www.sidrabe.com/assets/files/Web%20Coating%20with%20Lithium.pdf.

Yu, S., et al., "Elastic properties of the solid electrolyte $Li_7La_3Zr_2O_{12}$ (LLZO)," Chem. Mater, 2016, vol. 28(1), pp. 197-206.

Lin Chen et al., "Lithium Metal Protected by Atomic Layer Deposition Metal Oxide for High Performance Anodes", J. Mater. Chem. A, 2017,5, 12297-12309, May 26, 2017.

Lin Chen et al., "Li2S encapsulated by nitrogen-doped carbon for lithium sulfur batteries", J. Mater. Chem. A, 2014,2, 18026-18032, Sep. 26, 2014.

Lin Chen et al., "Mechanism for Al2O3 Atomic Layer Deposition on LiMn2O4 from In Situ Measurements and Ab Initio Calculations", Cell Press, vol. 4, Issue 10, Oct. 11, 2018, pp. 2418-2435.

Lin Chen et al., "Directly formed alucone on lithium metal for high-performance Li batteries and Li—S batteries with high sulfur mass loading", ACS Appl. Mater. Interfaces 2018, 10, 8, 7043-7051, Feb. 28, 2018.

Lingzi Sang et al., "Understanding the effect of interlayers at the thiophosphate solid electrolyte/lithium interface for all-solid-state Li batteries", Chem. Mater. 2018, 30, 24, 8747-8756, Nov. 30, 2018.

* cited by examiner

MATERIALS AND METHODS FOR COMPONENTS OF LITHIUM BATTERIES

CROSS REFERENCE TO RELATED APPLICATIONS

This application claims benefit of the filing dates and rights of priority to U.S. Provisional Application No. 62/681,674, filed on Jun. 7, 2018, U.S. Provisional Application No. 62/728,744, filed on Sep. 7, 2018, and U.S. Provisional Application No. 62/756,010, filed on Nov. 5, 2018, which are incorporated by reference herein.

FIELD

The present invention relates to anodes, cathodes and other components of lithium batteries.

BACKGROUND

Lithium batteries have superior electrochemical capacity, high operating potential and great charge and discharge cycles. Demand for lithium batteries is increasing in the fields of portable information terminals, portable electronic devices, small power storage devices for home use, motorcycles, electric cars, hybrid electric cars, and the like. Hence, improvements to the performance and the safety of lithium battery are desired in response to the increasing demand of such applications.

Conventional lithium batteries using a graphite anode are reaching to the theoretical capacity, leaving little room for the performance improvement. Such problems pertaining to use time of batteries come to the fore as electric cars are becoming popular.

In order to improve the energy density performance, thorough research is thus ongoing these days into lithium metal batteries using a lithium metal as the anode of lithium-ion batteries. However, the lithium used possesses potential safety issues, especially paired with liquid organic electrolytes that are flammable and have been used for years. Lithium-free anodes, which comprising copper as the anode, having advantages of high energy density and great safety, compatible with current manufacturing processes and low prices, are receiving attention as next-generation battery materials.

A lithium-ion battery is configured to include a cathode, an electrolyte layer and an anode with a separator in which the electrolyte layer possesses high ionic conductivity and low electronic conductivity. The cathode can contain lithium-ion or lithium-free material, and the anode can be the same comprising lithium-ions or lithium-free materials while lithium-ions have to contained in either of the cathode or the anode for the lithium-ion batteries. The currently commercial anode is graphite. However, the graphite is reaching to the theoretical capacity and leaves little room for the improvement. Lithium metal is considered as the "holy grail" of next-generation anodes due to its ultrahigh capacity (3,860 mAhg-1) and high negative potential (−3.04 V compared to standard hydrogen electrode).

However, the use of lithium metal in rechargeable batteries poses several major problems. First, when a lithium-metal battery discharges, lithium ions separate from the surface of the anode and travel to the cathode. When the battery is charged the same ions travel back and deposit onto the anode as lithium metal. But instead of forming a nice smooth coating on the anode, lithium metal has the tendency to generate "dendrites" chains of lithium atoms growing from the surface of the anode, which look like the roots of a tree. The dendrites grow bigger with each charge-discharge cycle, eventually reaching the cathode and causing the battery to short, leading to battery failure and potential fires. Second, lithium metal is highly reactive, which means it suffers side reactions with the battery's liquid electrolyte, which is itself an energy-rich medium. These undesirable reactions reduce the amount of lithium available and worsen the battery's life with every charge-discharge cycle. Third, lithium batteries may suffer from low Coulombic efficiency (CE), due to the parasitic reactions between lithium and electrolyte to form solid electrolyte interphase (SEI), leading to the continuous loss of lithium and increased resistance associated with electrolyte consumption and eventual batteries failure.

Since lithium is reactive with moisture, oxygen and nitrogen, it inevitably increases the cost of manufacturing. Even if somehow the costs could be reined in, such as incorporation of a pin-hole free coating on the anode, batteries with lithium metal inside are hard to pass safety tests when using current liquid organic electrolyte that is flammable. These tests are designed to put the battery in extreme, but real-life, conditions: piercing a nail into the battery (which might happen in a car accident) or heating it to more than 50° C., or 122° F. (a temperature that the interiors of cars or drones can easily reach) to ultimately melt down the polymer separator. To circumvent the safety test and not manufacture lithium metal anodes, this disclosure employs copper foil or other substrate as the starting anode with no lithium metal inside. In such way, the battery is manufactured in the exact same way as a conventional lithium-ion battery, including using a liquid electrolyte, a widely available cathode comprising lithium-ions and an anode that begins its life as a copper sheet or other substrates.

Qian et al. disclosed a method of highly concentrated electrolyte composed of 1,2-dimethoxyethane (DME) solvent and a high concentration of the LiFSI salt for an anode-free cell design (Cu vs. LiFePO$_4$). They also found that the cycle life of these cells can be extended when cycled with an optimized charge-discharge protocol. However, the cell fails at about 20 cycles. See Qian et al., Anode-Free Rechargeable Lithium Metal Batteries, Adv. Funct. Mater. 2016, 26, 7094-7102.

The target for such technology should at least last for 50 cycles before the capacity of batteries degrades below 80%. Therefore, there is still a need to develop a more advanced lithium-metal free anode for lithium-ion batteries.

Elam et al. US Pat. App. Publication No. 20190044151 discusses a hybrid protective coating which includes an inorganic component and an organic component such that the inorganic component includes at least one of a metal oxide, a metal fluoride, or combination thereof, and the organic component includes at least one metalcone.

Some currently available batteries employ graphite and silicon/carbon as the anode. However, graphite has a theoretical capacity of only 372 mAh/g and it is reaching its theoretical capacity, leaving no improvement room for future battery systems. As for the silicon/carbon batteries, although silicon has a theoretical capacity of 3580 mAh/g, the volume change (expansion and contraction) is 400% upon charge and discharge processes; However, the battery in pouch cells used in the military batteries, including batteries of drone and consumer electronics can only tolerate about 10%. This limits the mass loading of silicon in the anode and is not competitive with lithium anodes.

Hu et al. US Pat. App. Publication No. 20160293943 discusses a battery structure with a cathode, an electrolyte, and a lithium metal anode coated with a composite coating including a mixture of a polymer and a reinforcing fiber. The cathode and the lithium metal are held apart by a porous separator soaked with the electrolyte. The reinforcing fiber is dispersed in the polymer matrix. The composite coating is porous or non-porous. The composite coating conducts lithium ions. The reinforcing fiber is chemically functionalized.

Cho et al. US Pat. App. Publication No. 20160372743 discusses a lithium metal anode which includes a lithium metal layer and a multi-layer polymer coating disposed over the lithium metal layer. The multi-layer polymer coating includes a first outer polymeric crosslinked gel layer positioned for contact with a battery electrolyte and a second inner polymer layer disposed between the lithium metal layer and the first outer polymeric crosslinked gel layer. The first outer polymeric crosslinked gel layer includes a first polymer, a soft segment polymer, and an electrolyte. The second inner polymer layer includes a second polymer. The second inner polymer layer provides mechanical strength and serves as a physical barrier to the lithium metal layer.

SUMMARY

As one aspect of the present invention, a metal anode having a protective coating is provided. The metal anode comprises a metal layer comprising lithium, sodium, or potassium; and a protective coating on the metal layer. The protective coating comprises a composite material, and the composite material comprises an oxide or fluoride of lithium, sodium, or potassium.

As another aspect, the present invention provides a lithium-free metal or carbon electrode for a lithium ion battery. The electrode comprises a metal or carbon layer and a protective coating on the metal layer. The protective coating can comprise aluminum oxide, titanium oxide, hafnium oxide, or one of the other materials described herein, including any combination thereof.

As another aspect, a method is provided for preparing an anode configured for use in a lithium-ion battery. The method comprises depositing a coating material on a metal substrate by atomic layer deposition (ALD), chemical vapor deposition (CVD), plasma enhanced chemical vapor deposition (PECVD), sputtering, physical vapor deposition (PVD), plasma enhanced atomic layer deposition (PEALD), spinning coating, dip coating, pulsed laser deposition (PLD), or any combination thereof. The coating material is dielectric and lithium-ion conductive.

As yet another aspect, a cathode comprising a metal layer is provided. The cathode has a surface and comprises a lithium-based material. The cathode also comprises an inert material on the surface of the metal layer. The cathode is configured for use as the cathode of a lithium-ion battery or lithium-sulfur battery. The present disclosure also provides a process for preparing cathodes comprising depositing a thin layer of the inert material onto the surface of the metal layer by atomic layer deposition, plasma enhanced atomic layer deposition, chemical vapor deposition, plasma enhanced chemical vapor deposition, sputtering, physical vapor deposition, spinning coating, dip coating, or pulsed laser deposition.

As another aspect, a method of preparing a thin layer comprising lithium is provided. The method comprises a) applying one or more interlayer material onto a substrate to form an interlayer material coated substrate; b) heating the interlayer material coated substrate to an elevated temperature; and c) applying one or more metal layers onto the interlayer material coated substrate, wherein the metal layer comprises lithium.

As another aspect, an electrode is provided for a lithium ion battery. The electrode comprises a metal layer, and a protective coating on the metal layer, wherein the protective coating comprises hafnium oxide, lithium hafnium oxide, a lithium fluoride-lithium carbonate composite, or a combination thereof. The metal layer can be lithium, copper or another metal. The protective coating can be formed by atomic layer deposition or plasma enhanced atomic layer deposition.

As another aspect, a method is provided for preparing a coated lithium layer. The method comprises depositing a coating material on a lithium layer by a roll-to-roll process, extrude printing or 3D printing.

These and other features and advantages of the present methods and compounds will be apparent from the following detailed description, in conjunction with the appended claims.

BRIEF DESCRIPTION OF THE DRAWINGS

FIGS. 5A, 5B and 5C show charge-discharge performance of batteries with HfO$_2$ coated Li or with bare Li cycled at 0.33 C at room temperature. (a) Cycling performance of 8 nm HfO$_2$ coated Li with NMC811 cathodes. (b) Cycling performance of bare Li with NMC811 cathodes. (c) Energy density of the battery comprising 8 nm HfO$_2$ coated Li with NMC811 cathodes.

The present teachings are best understood from the following detailed description when read with the accompanying drawing figures. The features are not necessarily drawn to scale. Wherever practical, like reference numerals refer to like features.

DETAILED DESCRIPTION

Figure 1A:
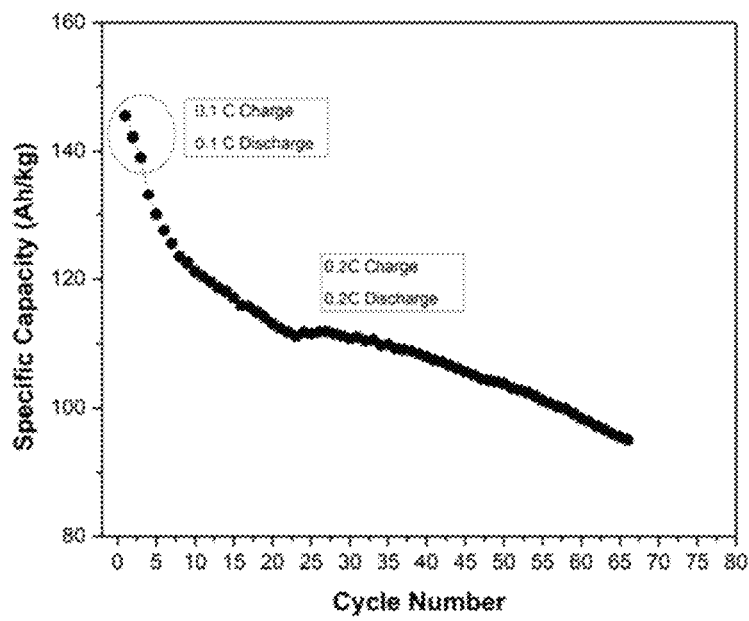
FIG. 1A shows the capacity of coin cells of Example 1 at 0.2 C, wherein the coin cells comprise ~5 mAh/cm$^2$ LiNiMnCoO$_2$ (Ni:Mn:Co=5:3:2), represented by NMC532, as the cathode and HfO$_2$ coated Cu as the anode.

It is to be understood that the terminology used herein is for purposes of describing particular embodiments only, and is not intended to be limiting. The defined terms are in addition to the technical and scientific meanings of the defined terms as commonly understood and accepted in the technical field of the present teachings.

As used herein, a "battery" refers to any container in which chemical energy is converted into electricity and used as a source of power. The terms battery and cell are generally interchangeable when referring to one electrochemical cell, although the term battery can also be used to refer to a plurality or stack of electrically interconnected cells. A battery includes an anode and a cathode operationally connected by an electrolyte, and typically includes various other battery components such as separators, current collectors, housings.

A lithium-ion battery typically includes an anode and a cathode separated by an electrically insulating barrier or separator, and the electrolyte medium typically includes one or more lithium salts and a solvent such as an organic carbonate material. During the charging process, the positively charged lithium ions move from the cathode, through the permeable separator, to the anode and reduce into Li metal. During discharge, the Li metal is oxidized to positively charged lithium ions which move from the anode, through the separator, and onto the cathode, while electrons move through an external load from the anode to the cathode, yielding current and providing power for the load. During the initial charging, the surface of the anode may react with lithium ions and components of the electrolyte to form a layer of material referred to as a "solid electrolyte interface" (SEI) layer. As used herein, the term "lithium battery" generally refers to lithium ion batteries, but also encompasses lithium-sulfur batteries and other batteries comprising a lithium-based material.

In the present disclosure, the terms "coating" and "film" generally have the same meaning unless the context indicates otherwise. The terms "protective" and "inert" also generally mean the same. As will be apparent from the present disclosure, an inert thin film may function as a protective coating, and a protective coating may have one or more physical characteristics of a thin film.

As used herein, a "layer" refers to a structure having length, width and thickness, and generally the thickness is smaller than length and/or width. A layer generally comprises opposing major surfaces defined by the length and width and separated from each other by the thickness. Layers can be selected to possess one or more properties, such as permeability, conductivity, or others. For instance, layers can be permeable, semipermeable, or substantially impermeable, wherein permeability is determined with respect to one or more substances. Layers can be electrically conductive, semi-conductive or insulating. A thin layer is one where the thickness is much smaller than length and/or width, such as where the thickness is at least $10^x$ smaller the length and/or width, where x is −3, −4, −5, −6, −7, −8 or a lower negative number.

Throughout this disclosure, any of the metal layers of anodes or cathodes described herein can have a thickness of at least 200 nm, or 500 nm, or 750 nm, or 1 μm, or 2 μm, or 5 μm, or 7.5 μm, or 10 μm, or 20 μm, or 25 μm, or 50 μm; and/or a thickness of at most 500 μm, or 400 μm, or 300 μm, or 200 μm, or 150 μm, or 125 μm, or 100 μm, or 90 μm, or 75 μm, or 60 μm. It is contemplated that any of these minimums and maximums can be combined to form a range (e.g., a thickness from 10 to 150 μm, and that any of these values can be approximate (e.g., about 50 μm). Any of the protective coatings, thin layers or inert layers described herein can have a thickness of at least 0.24 nm, or 0.48 nm, or 1 nm, or 2 nm, or 5 nm, or 10 nm, or 25 nm, or 50 nm, or 100 nm, or 250 nm, or 500 nm, or 1 μm, or μm; and/or a thickness of at most or 500 nm, or 1 μm, or 2.5 μm, or 5 μm, or 7.5 μm, or 10 μm, or 20 μm, or 25 μm, or 50 μm. It is contemplated that any of these minimums and maximums can be combined to form a range (e.g., a thickness from 10 nm to 1 μm, and that any of these values can be approximate (e.g., about 250 nm).

In the present disclosure, various depositions techniques are employed for creating or applying layers. For instance, a protective layer can be formed on a metal layer by chemical vapor deposition or atomic layer deposition. In chemical vapor deposition (CVD), a substrate is exposed to one or more precursors which react on the substrate to produce the deposited layer or film. Atomic layer deposition (ALD) is a chemical vapor deposition where precursors are sequentially provided to react with a surface (such as a substrate or a previously deposited layer of precursor). By repeated exposure to separate precursors, a thin film is deposited. Other deposition techniques which may be used in accordance with the present disclosure are spatial atomic layer deposition, plasma enhanced atomic layer deposition, plasma enhanced chemical vapor deposition, sputtering, physical vapor deposition, spinning coating, dip coating, or pulsed laser deposition. Spatial atomic layer deposition (SALD) is based on separating the precursors in space rather than in time. With SALD, one may avoid the step of purging precursors as typically done in ALD, so faster deposition rates are achievable. "Plasma enhanced" deposition techniques employ gases that have been partially ionized, and high energy electrons in the plasmas can be used to disassociate precursors or reactants into highly reactive radicals.

As one aspect of the present invention relates to the use of advanced materials to coat metal anodes, including lithium, sodium and potassium. These advanced materials are formed as thin films. The thin films can be applied by thin film deposition techniques, including, but not limited to, chemical vapor deposition, atomic layer deposition, pulsed laser deposition, physical vapor deposition, dip coating, spin coating, electroplating, or molecular-beam epitaxy.

In some embodiments, the protective coating comprises a metal-based composite where the metal is the same as in the metal layer. The advanced materials for lithium metal, for example, can be lithium-incorporated composites, which means it is formed by two or more compounds. In some embodiments, the composite material can be a lithium fluoride (LiF) based composite, such as lithium fluoride-lithium oxide (LiF—$Li_2O$), lithium fluoride-lithium carbonate (LiF—$Li_2CO_3$), lithium fluoride-lithium hexafluorophosphate (LiF—$LiPF_6$), lithium fluoride-lithium phosphate (LiF—$LiPO_4$), lithium fluoride-lithium tetrafluoroborate (LiF—$LiBF_4$), lithium fluoride-carbon fluoride (LiF—$CF_4$) or any combination of these materials. In some embodiments, the composite material comprises lithium fluoride-lithium oxide (LiF—$Li_2O$), lithium fluoride-lithium carbonate (LiF—$Li_2CO_3$), lithium fluoride-lithium hexafluorophosphate (LiF—$LiPF_6$), lithium fluoride-lithium phosphate (LiF—$LiPO_4$), lithium fluoride-lithium tetrafluoroborate (LiF—$LiBF_4$), lithium fluoride-carbon fluoride (LiF—$CF_4$), $Li_2O$—$Li_2CO_3$, $Li_2O$—LiF, $Li_2O$—$LiPO_4$, $Li_2O$—$LiBF_4$, $Li_2O$—$CF_4$, $HfO_2$, $Li_xHfO_2$, $SiO_2$, LiF—$NbO_2$, $Li_3N$—AlN, $Li_xSi_3N_4$, $Li_xNb_3N_4$, where where X≥0, or any combination of these materials. These compounds will be combined uniformly in the composite material for the protective coating. In some embodiments, the protective coating or film comprises a composite material selected from lithium oxide-contained composites, including $Li_2O$—$Li_2CO_3$, $Li_2O$—LiF, $Li_2O$—$LiPO_4$, $Li_2O$—$LiBF_4$, $Li_2O$—$CF_4$, or any combination of these materials. For a sodium or potassium anode, the advanced materials are the same compositions but based on sodium or potassium in place of lithium. For example, the composite material for sodium can be sodium fluoride-sodium oxide (NaF—$Na_2O$), and for a potassium anode, it can be potassium fluoride-potassium oxide (KF—$K_2O$).

In some embodiments, a metal anode having a protective coating comprises a metal layer comprising lithium, sodium, or potassium; and a protective coating or film formed on the metal layer; wherein the film comprises a composite material, and the composite material comprises lithium fluoride-lithium oxide (LiF—$Li_2O$), lithium fluoride-lithium carbonate (LiF—$Li_2CO_3$), lithium fluoride-lithium hexafluorophosphate (LiF—$LiPF_6$), lithium fluoride-lithium phosphate (LiF—$LiPO_4$), lithium fluoride-lithium tetrafluoroborate (LiF—$LiBF_4$), lithium fluoride-carbon fluoride (LiF—$CF_4$) or any combination of these materials. These compounds will be combined uniformly in the composite material for the protective coating. In some embodiments, the protective coating or film comprises a composite material selected from (a) lithium oxide-containing composites, including $Li_2O$—$Li_2CO_3$, $Li_2O$—LiF, $Li_2O$—$LiPO_4$, $Li_2O$—$LiBF_4$, $Li_2O$—$CF_4$, or any combination of these materials when the metal layer comprises lithium; (b) sodium oxide-containing composites, including $Na_2O$—$Na_2CO_3$, $Na_2O$—NaF, $Na_2O$—$NaPO_4$, $Na_2O$—$NaBF_4$, $Na_2O$—$CF_4$, or any combination of these materials when the metal layer comprises sodium, and (c) potassium oxide-containing composites, including $K_2O$—$K_2CO_3$, $K_2O$—KF, $K_2O$—$KPO_4$, $K_2O$—$KBF_4$, $K_2O$—$CF_4$, or any combination of these materials when the metal layer comprises potassium.

In some embodiments, a metal layer of the metal anode has a thickness of 10-100 μm, alternatively 1-200 μm, alternatively 1-300 μm, wherein the metal (M) is lithium, sodium or potassium.

In some embodiments, the protective coating is a protective layer formed or coated on the metal layer, wherein the protective layer has a thickness from 1 nm to 10 microns. The protective coating can be formed on the metal layer, such as by being deposited on one or both major surfaces of the metal layer, and in some embodiments, one or both major surfaces of a metal layer are entirely covered by a protective coating. In some embodiments, the protective layer comprises $HfO_2$, $M_xHfO_2$, $SiO_2$, MF-$M_2O$, MF-$M_2CO_3$, MF-$MPF_6$, MF-$M_3PO_4$, MF-$MBF_4$, MF-$CF_4$, MF-$NbO_2$, $M_2O$-$M_2CO_3$, $M_2O$-MF, $M_2O$-$MsPO_4$, $M_2O$-$MBF_4$, $M_2O$—$CF_4$, $M_3N$—AlN, $M_3N$—AlN, $M_xSi_3N_4$, $M_xNb_3N_4$, or any combination thereof, where X≥1 and M is Li, Na, K, or a mixture thereof.

For example, the metal anode can comprise ultrathin lithium (e.g., 20 micrometer) as the metal layer and an ion-conductive, conformal coating as the protective coating on the ultrathin lithium layer. The coating can be prepared using atomic layer deposition or spatial atomic layer deposition (SALD) or other thin film deposition technique. In some embodiments, the protective coating comprises two or more layers, such as a layer of hafnium oxide ($HfO_2$) and a layer of lithiated hafnium oxide ($Li_xHfO_2$), thereby providing a highly Li+ conductive, the ultrastable ability as well as high electronic resistant film for the ultrathin lithium metal layer. $HfO_2$ possesses a shear modulus as high as 130 GPa. Through incorporation of lithium and the coating optimization (Li composition and film thickness), a suitable metal anode can be made for inclusion in Li-ion batteries such as coin cells and pouches having NMC as the cathode.

In view of the relatively low ionic conductivity of $HfO_2$, it is desirable to include lithium into the $HfO_2$ to form a film comprising $Li_xHfO_2$, where X≥0. Such a film has great Li+ conductivity and can be deposited directly onto lithium metal foils through ALD or SALD. With this higher ion-conductive coating, the cycle life will be greatly extended because $LiHfO_2$ can readily facilitate the lithium ions transportation and enable uniform lithium stripping/plating process. The current rate for charge and discharge of the battery systems using the present anode materials can be higher than 0.33 C and provide higher power devices for different applications, such as drones and vehicles. It is contemplated that a combination of lithium and $HfO_2$ in a thin layer can dramatically increase the lithium-ion conductivity to $10^{-4}$ S/cm scale (Huang, B., et al., "Li-ion conduction and stability of perovskite $Li_{3/8}Sr_{7/16}Hf_{1/4}Ta_{3/4}O_3$." 2016. 8(23): p. 14552-14557), and it possesses great mechanical strength, up to 130 GPa, which is about 15 times the sufficient value (8.5 GPa) to prevent the lithium dendrites, as well as high chemical stability in a wide electrochemical window.

A schematic diagram for $Li_xHfO_2$ is shown in FIG. C. The precursors to synthesize $HfO_2$ by atomic layer deposition are tetrakis(dimethylamido) hafnium (TMDA-hafnium) and water. The water housed in a room-temperature container reacts with the four dimethylamino ligands and forms oxide, bonding to the Hf element. The reaction can be cycled for N times and the growth rate is 1 angstrom (Å) per cycle, so that from the reaction the thickness of $HfO_2$ is N Å. The incorporation of lithium into the $HfO_2$ thin film is completed by preparing $Li_2O$. The precursors to synthesis the $Li_2O$ film by ALD are lithium tert-butoxide (LTB) and water. LTB is contained and heated at 135° C. with argon as the carrier gas, and carried into the ALD reactor. The three methyl groups react well with water and form oxides, bonding to the lithium element. This reaction also can be cycled for M times and the growth rate is 1.2 Å/cycle, so that the thickness of $Li_2O$ is 1.2M A. For the final coating, i.e., $M(Li_2O) \cdot N$ ($HfO_2$), the composition and thickness depend on the number of M and N, where M is $\geq 0$ and N is $\geq 1$. To simplify the description of this material, it is sometimes referred to as $Li_xHfO_2$ herein.

The present metal anodes can also comprise a current collector, such as copper and stainless steel. For example, a metal layer may have first and second major surfaces, and a protective coating may be disposed on the first major surface and the current collector may be disposed on the second major surface.

In some embodiments, the protective coating or one or more layers of the coating comprises $MF-M_2CO_3$, $MF-M_3N$, $HfO_2$, $M_xHfO_2$ (metal-ion integrated $HfO_2$), or any combination thereof. The protective layer can be formed on the metal layer by atomic layer deposition, plasma enhanced atomic layer deposition, chemical vapor deposition, plasma enhanced chemical vapor deposition, sputtering, physical vapor deposition, spinning coating, dip coating, or pulsed laser deposition.

The metal anodes having a protective coating as described herein can be used to solve several problems, such as the formation of dendrites though not every embodiment necessarily solves every problem. Metal anodes form dendrites that can penetrate the battery separator and reaches the cathode side to cause short circuits during charge and discharge processes. Putting a protective coating or thin film on the metal anode will suppress the lithium dendrite and solve the problem. The inorganic composite film has excellent mechanical properties that can suppress dendrite formation on metal anodes, and has great ionic conductivity, leading to high charge-discharge rate with stable electrode morphology. Thus, the short circuit is prevented and the battery using metal anodes will be safe.

The present metal anodes can also solve the problem of electrolyte consumption. Liquid electrolyte or solid electrolyte will be reduced when contacted with metal anodes. Such thin film coating on metal anodes can prevent or largely diminish the electrolyte consumption because the film prevents the direct contact between metal anodes and electrolyte. Longer Use Life: Coupled with either of solid electrolyte or liquid electrolyte, protected metal anodes cannot contact the electrolyte directly with the protection layer between them. Thus, it largely diminishes the electrolyte consumption. Also, with less dendrites, the surface area of metal anodes is decreased and the contact area between the anode and the electrolyte is reduced for less electrolyte consumption as well. The batteries with protected metal anodes consuming less electrolyte will last longer.

The present metal anodes can overcome one or more of the problems associated with by providing coatings to act as artificial SEI layers. In order to achieve homogenous current distributions for ultrastable lithium anodes in a cell, it is desirable that an SEI meets several criteria:

1) chemically stable in a highly reducing environment;
2) compositionally homogenous and conformal to house lithium beneath the SEI;
3) intimate contact or strong adhesion with lithium metal for minimized resistance and accommodating the volume changes;
4) electronic insulating or possess large nucleation energy for lithium for uniform current distribution;
5) high shear modulus to greatly suppress lithium dendrites. Besides, the coating with high lithium ionic conductivity can facilitate the ion transportation and lead to uniform lithium stripping and platting.

The present metal anodes can be incorporated into and configured for use in Li-ion batteries, such as coin cells and pouch cells, such as batteries comprising lithium nickel manganese cobalt oxide (NMC) as the cathode (for example, 34×50 $mm^2$ pouch cells with double-sides coated 5 mAh/$cm^2$ NMC cathodes). In some embodiments, the present disclosure provides batteries having: (a) a battery energy density of 450 Wh/kg or higher (cell level) and/or 400 Wh/kg or higher (battery level); (b) battery cycle life, measured by retention of 80% of its initial capacity, of 250 cycles or higher, alternatively 1,000 cycles or higher; (c) wide temperature operations including the range of −20° C. to 55° C.

The present metal anodes can be incorporated into and configured for use in drones, consumer electronics, automotive, grid and defense. Any other areas that need power sources, our technology can find an application.

As another aspect, the present disclosure provides coatings and films comprising hafnium oxide ($HfO_2$) or lithium hafnium oxide ($Li_xHfO_2$, where $X \geq 0$), as well as novel methods of making such coatings and films. In some embodiments, the protective coating is formed on an electrode (an anode or a cathode) configured for use in a lithium ion battery, such as to permit intercalation of lithium ions. Hafnium oxide has been used in the semiconductor industry, but it is not known as being used as an anode coating. Hafnium oxide has excellent performance as an artificial SEI. It is very stable in contact with lithium metal and has excellent stability at a wide electrochemical window. With regard to the high dielectric constant, the k value of $HfO_2$ is as high as 25, compared to the k=8 of $Al_2O_3$ that was used for lithium metal protection in the literature. Studies have shown that materials with shear modulus of 8 GPa are able to suppress lithium dendrites (Yu, S., et al., "Elastic properties of the solid electrolyte $Li_7La_3Zr_2O_2$ (LLZO)." 2015. 28(1): p. 197-206.), while $HfO_2$ possesses a shear modulus as high as 130 GPa, over 15 times that of the desired shear modulus.

Conventional methods of applying certain thin films require high temperature (>400° C.) that would melt lithium (melting point: 181° C.) for the $HfO_2$ synthesis. Besides, only the atomic layer deposition (ALD) technology can make conformal and pure $HfO_2$ films, excluding methods like physical vapor deposition (PVD), at very low temperature (150° C.).

Preferably, the protective layer is formed by atomic layer deposition or plasma enhanced atomic layer deposition.

In some embodiments, the metal of the metal layer is Li and the protective layer is $Li_xHfO_2$ where $x \geq 0$.

As another aspect, the present disclosure provides coatings and films comprising lithium fluoride (LiF) based composite coating, such as lithium fluoride-lithium carbonate (LiF—$Li_2CO_3$), as well as novel methods of making such coatings and films. In some embodiments, the protective coating on an anode or cathode comprises lithium fluoride-lithium carbonate. LiF and $Li_2CO_3$ has excellent performance as an artificial SEI. It is very stable in contact with lithium metal and has excellent stability at a wide electrochemical window. Studies have shown that materials with shear modulus of 8 GPa are able to suppress lithium dendrites (Yu, S., et al., "Elastic properties of the solid electrolyte $Li_7La_3Zr_2O_{12}$ (LLZO)." 2015. 28(1): p. 197-206.), while LiF—$Li_2CO_3$ possesses a shear modulus as high as 50-120 GPa, several times that of the desired shear modulus. LiF—Li$_2$CO$_3$ possesses high ion conductivity that can accommodate the fast lithium ion stripping and plating.

Conventional methods of applying certain thin films require high temperature (>200° C.) that would melt lithium (melting point: 181° C.) for the LiF and Li$_2$CO$_3$ synthesis. The atomic layer deposition (ALD) technology can make conformal and pure LiF—Li$_2$CO$_3$ films, and methods like physical vapor deposition (PVD) can make the pure composite coating, at very low temperature (150° C.).

Preferably, the protective layer is formed by atomic layer deposition or plasma enhanced atomic layer deposition. In some embodiments, the metal of the metal layer is Li and the protective layer is LiF—(Li$_2$CO$_3$)$_x$ where x≥0.

As another aspect of the present invention, novel cathodes and battery components are provided. The cathodes comprise a thin film or layer on an aluminum metal layer, such as a lithium-based material. In some embodiments, the cathodes comprise a metal oxide or sulfur-based material having a surface, and an inert material coating the surface of the metal oxide or sulfur-based material layer. In other embodiments, other battery components comprise the protective coating on a battery component layer or material.

The cathodes comprise a high voltage and energy, lithium-based material having a surface layer material comprising a thin layer comprising an inert material. The cathodes are configured for use as the cathode of a lithium-ion battery. In some embodiments, the cathodes comprise a high energy, sulfur-based material having a surface layer material comprising a thin layer and an inert material. The cathodes are configured for use as the cathode of lithium-sulfur battery.

In some embodiments, the inert material comprises a metal, a metal oxide, a metal halide, a metal oxyfluoride, a metal nitride, a metal carbonate, a metal sulfide, a metal sulfate, a metal phosphate, a non-metal oxide, a non-metal carbide, a non-metal, or mixture of any two or more thereof. In some embodiments, the inert material comprises a material selected from the group consisting of Al, Cu, Al$_2$O$_3$, TiO$_2$, ZnO, La$_2$O$_3$, NbO$_2$, ZrO$_2$, Li$_2$O, HfO$_2$, GaO$_2$, GeO$_2$, CeO$_2$, MgO, CaO, LiF, AlF$_3$, LiAlF$_4$, MgF$_2$, Zn$_2$OF$_2$, Li$_3$FO, LiCF$_5$, Li$_3$N, TiN, Li$_2$CO$_3$, CaCO$_3$, ZnCO$_3$, La$_2$(CO$_3$)$_3$, Nb (CO$_3$)$_2$, MgCO$_3$, Li$_2$S, ZnS, GaS$_2$, TiS$_2$, NbS$_2$, HiS$_2$, CaS, La$_2$S$_3$, BaSO$_4$, Li$_3$PO$_4$, AlPO$_4$, WF$_4$, W(PO$_4$)$_2$, SiO$_2$, SiC, Si, carbon, or mixtures of any two or more thereof. In some embodiments, the inert material comprises a hafnium oxide, lithium hafnium oxide, a lithium fluoride-lithium carbonate composite, LiF, La$_2$O$_3$, NbO$_2$, ZrO$_2$, Li$_2$O, GaO$_2$, GeO$_2$, CeO$_2$, MgO, CaO, AlF$_3$, LiAlF$_4$, MgF$_2$, Zn$_2$OF$_2$, Li$_3$FO, LiCF$_5$, LibN, TiN, Li$_2$CO, CaCO$_3$, ZnCO$_3$, La$_2$(CO$_3$)$_3$, Nb (CO$_3$)$_2$, MgCO$_3$, Li$_2$S, ZnS, GaS$_2$, TiS$_2$, NbS$_2$, HfS$_2$, CaS, La$_2$S$_3$, BaSO$_4$, Li$_3$PO$_4$, AlPO$_4$, WF$_4$, W(PO$_4$)$_2$, lithium niobium oxides, lithium hafnium oxides and lithium lanthanum oxides, lithium oxide (Li$_2$O), lithium phosphate (Li$_3$PO$_4$), lithium silicon oxide, lithium aluminum phosphate (Li$_x$AlPO$_4$), and lithium fluoride containing composite materials, or mixtures of any two or more thereof.

The cathodes comprise a metal layer with any cathode material. In some embodiments, the metal layer comprises a cathode material such as a lithium-based cathode material. In some examples, cathode material is Li$_x$Ni$_Y$Mn$_Z$Co$_N$O$_2$ (NMC, X≥1, Y≥0.6, Z≥0.1, N≥0), Li$_x$Ni$_Y$Mn$_N$O$_2$ (NMO, X≥1, Y≥0.2, N≥0.2), or Li$_x$Ni$_Y$Co$_Z$Al$_N$O$_2$ (NCA, X≥1, Y≥0.6, Z≥0, N≥0.01), where some other metals, such as aluminum, titanium or manganese, might be doped in the material with ratio of less than 0.015.

In some embodiments, the cathode material is selected from Li$_x$Ni$_Y$Mn$_Z$Co$_N$O$_2$ (NMC, X≥1, Y≥0.6, Z≥0.1, N≥0), Li$_x$Ni$_Y$Mn$_N$O$_2$ (NMO, X≥1, Y≥0.2, N≥0.2), and Li$_x$Ni$_Y$Co$_Z$Al$_N$O$_2$ (NCA, X≥1, Y≥0.6, Z≥0, N≥0.01), optionally with a dopant. The dopant can be another metals, such as aluminum, titanium or manganese, and it might be doped in the cathode material with ratio of less than 0.02, or 0.015, or 0.01. Cathode layers can be synthesized from cathode materials in powder form (or other form) by flame-assisted pyrolysis, preferably with powder size from 50 nm to 50 μm.

In some embodiments, the present cathodes comprise a lithium-based material having a surface; and a thin layer comprising an inert material on the surface.

As other embodiments, the battery component having a thin film or a protective coating is a membrane/separator. Instead of a cathode layer or cathode material, the component comprises membrane/separator materials.

The present cathodes and battery components comprise a thin layer on the cathode material, membrane/separator material, or other component material. The thin layer can have a thickness of 0.1 nm to 10 microns, wherein the thin layer comprises an inert material, such as HfO$_2$, M$_x$HfO$_2$, SiO$_2$, MF-M$_2$O, MF-M$_2$CO$_3$, MF-MPF$_6$, MF-M$_3$PO$_4$, MF-MBF$_4$, MF-CF$_4$, MF-NbO$_2$, M$_2$O-M$_2$CO$_3$, M$_2$O-MF, M$_2$O-M$_3$PO$_4$, M$_2$O-MBF$_4$, M$_2$O—CF$_4$, M$_3$N—AlN, Li$_3$N—AlN, LixSi$_3$N$_4$, LixNb$_3$N$_4$, or any combination thereof, wherein M can be lithium or sodium or magnesium or any combination thereof and x can be >0. In some embodiments, the thin layer comprises MF-M$_2$CO$_3$, MF-M$_3$N, HfO$_2$, M$_x$HfO$_2$ (metal-ion integrated HfO$_2$), or any combination thereof.

In some embodiments, the cathode material can be nano-sized or microsized powder, and/or the cathode material can be sulfur or lithium sulfide powders, and/or the thin layer can comprise two or more layers of the inert material.

As another aspect, a process for preparing a cathode is provided. The process comprises depositing a thin layer of inert material onto a layer of cathode material by dip coating, sputter coating, chemical vapor deposition, atomic layer deposition, or spin coating on the surface of a cathode material as powders or a cathode laminate, wherein the powders can be made by any approach, including sol-gel method, solid state reactions, ultrasonic spray pyrolysis, flame-assisted pyrolysis, liquid-feed flame spray pyrolysis, or co-precipitation. The cathode is configured for use as a cathode in a lithium-ion battery.

In some embodiments, the thin layer is formed by atomic layer deposition, plasma enhanced atomic layer deposition, chemical vapor deposition, plasma enhanced chemical vapor deposition, sputtering, physical vapor deposition, spinning coating, dip coating, or pulsed laser deposition. Preferably, the protective layer is formed by atomic layer deposition or plasma enhanced atomic layer deposition.

In some embodiments of the present cathode or process, the cathode material is made with average diameter of 50 nm to 50 μm powders and/or the cathode material is mixed with a binder and conductive additives for a cathode as a laminate. For example, the process can comprise forming the metal layer from a cathode material powder, which has a suitable particle size, such as a mean particle size from 50 nm to 50 m, or from 500 nm to 5 μm.

In some embodiments, the depositing of the thin layer comprises depositing the thin layer in one or more multiple times or cycles; and/or the depositing of the thin layer is by atomic layer deposition or chemical vapor deposition. For instance, depositing of the thin layer can comprise providing an inert material precursor configured to decompose or react in the depositing to form the inert material. In some embodiments, the inert material precursor is a trimethylaluminum, AlCl$_3$, tris-(dimethylamido)aluminum, trialkylaluminum, trifluoroaluminum, trichloroaluminum, tribromoaluminum, $AlMe_2Cl$, $AlMe_2OPr$, $Al(OEt)_3$, $Al(OPr)_3$, $ZrCl_3$, $ZiC_4$, $ZrI_4$, $ZrCp_2Cl_2$, $ZrCp_2Me_2$, Zirconium tert-butoxide or called $Zr(OtBu)_4$, $Zr(dmae)_4$, $Zr(thd)_4$, $Zr(NMe_2)_4$, $Zr(NEt_2)_4$, $Zr(OPr)_2(dmae)_2$, $Zr(OtBu)_2(dmae)_2$, $Zr(NEtMe)_4$, $ZnCl_2$, $ZnEt_2$, $ZnMe_2$, $Zn(OAc)_2$, $SiCl_4$, $SiCbH$, $SiCl_2H_2$, Bis(trimethylsilyl)amine, $Si(NCO)_4$, $MeOSi(NCO)_4$, $GeCl_4$, $MgCp_2$, $Mg(thd)_2$, $TiCl_4$, $TiI_4$, $Ti(OMe)_4$, $Ti(OEt)_4$, $Ti(OPr)_4$, $Ti(OPr)_2(dmae)_2$, $Ti(OBu)$, or $Ti(NMe_2)_4$, tris(isopropylcyclopentadienyl) lanthanum, $La(TMHD)_3$, TDMASn, TDMAHf, $HfCl_4$, LiOtBu, $CO_2$, water, oxygen, ozone, hydrogen fluoride, hydrogen fluoride pyridine, tungsten hexafluoride, (tert-butylimido)-tris(diethylamino)-niobium or called $tBuN=Nb(NEt_2)_3$, $tBuN=Nb(NMeEt)_3$, H2S, bis-(tri-isopropylcyclopentadienyl)calcium, disilane ($Si_2H_6$), silane ($SiH_4$), monochlorosilane ($SiH_3Cl$), $C_2H_2$, $CCl_4$, $CHCl_3$, and mixtures thereof.

The inert material precursors can be manipulated to tune the element ratio in the material. The inert material precursors can be metal organics which permit the material synthesis to be performed at low temperatures (e.g., from 80° C. to 300° C.). The synthesized material can then be sintered at high temperature if desired.

In some embodiments, the inert material precursors are inorganics and thus the material synthesis is performed at high temperature (e.g., 500° C.-1200° C.).

In some embodiments, a chemical vapor based technology, such as atomic layer deposition and chemical vapor deposition, to make a thin film or protective coating on cathode material powders onto cathode laminates after casting of cathode material powders onto current collectors. The present process can also comprise forming the metal layer by mixing the cathode material with a binder and conductive additives to form a laminate. For example, the cathode material, the binder, and the conductive additivies can be cast onto a current collector before forming the laminate.

In some embodiments, the thin film or coating can be deposited onto sulfur-based cathodes, such as lithium sulfide ($Li_2S$). Suitable coating or inert materials can be lithium metal oxides (lithium niobium oxides, lithium hafnium oxides and lithium lanthanum oxides, etc.), lithium oxide ($Li_2O$), lithium phosphate ($Li_3PO_4$), lithium silicon oxide, lithium aluminum phosphate ($Li_xAlPO_4$), and lithium fluoride based materials, including but not limited to LiF, and lithium fluoride based composition materials such as lithium aluminum fluoride ($Li_xAlF_y$), lithium tungsten aluminum fluoride ($Li_xWAlF_y$), lithium fluoride-lithium oxide (LiF—$Li_2O$), lithium fluoride-lithium carbonate (LiF—$Li_2CO_3$), lithium fluoride-lithium hexafluorophosphate (LiF—$LiPF_6$), lithium fluoride-lithium phosphate (LiF—$LiPO_4$), lithium fluoride-lithium tetrafluoroborate (LiF—$LiBF_4$) and lithium fluoride-carbon fluoride (LiF—$CF_4$), or any combination of these materials.

The present disclosure also relates to a novel method of preparing lithium-free anodes, capable of making safe, high energy, and low-cost lithium ion batteries.

In one aspect, the present disclosure provides a method of preparing lithium-metal free anodes and coated metal foils as the anode materials of lithium-ion batteries or starting materials for such anodes. The method may include: atomic layer deposition (ALD), chemical vapor deposition (CVD), plasma enhanced chemical vapor deposition (PECVD), sputtering, physical vapor deposition (PVD), plasma enhanced atomic layer deposition (PEALD), spinning coating, dip coating, pulsed laser deposition (PLD), or any combination thereof.

In some embodiments, the method of preparing an anode configured for use in a lithium-ion battery comprises depositing a coating material on a metal substrate by atomic layer deposition (ALD), chemical vapor deposition (CVD), plasma enhanced chemical vapor deposition (PECVD), sputtering, physical vapor deposition (PVD), plasma enhanced atomic layer deposition (PEALD), spinning coating, dip coating, pulsed laser deposition (PLD), or any combination thereof; wherein the coating material is dielectric and lithium-ion conductive. The present disclosure relates to the metal substrate materials coated with advanced materials made by the deposition technologies listed above. The metal substrate includes, but is not limited, to copper, nickel, titanium, carbon or graphite foil, tantalum (Ta) foil, tungsten (W) foil, vanadium (V) foil, or stainless steel or any combination thereof. The thickness of the substrate can range from 0.1 microns to 50 microns.

In yet another aspect, the present disclosure provides coating materials made by the deposition technologies listed above onto the metal substrate. The coating materials are dielectric, which means that they are good electronic barrier materials. Also, they may possess good lithium-ion conductive property. The materials include, but are not limited to, aluminum oxide, titanium oxide, hafnium oxide, zirconium dioxide, lithium oxide, lanthanum oxide, zinc oxide, antimony tetroxide, antimony pentoxide, arsenic trioxide, arsenic pentoxide, barium oxide, bismuth oxide, bismuth oxide, calcium oxide, cerium oxide, cerium oxide, chromium oxide, chromium oxide, chromium oxide, chromium oxide, cobalt oxide, cobalt oxide, cobalt oxide, copper oxide, copper oxide, iron oxide, iron oxide, lead oxide, magnesium oxide, manganese oxide, mercury oxide, nickel oxide, rubidium oxide, silicon dioxide, silver oxide, thallium oxide, thallium oxide, thorium oxide, tin oxide, uranium oxide, tungsten oxide, selenium dioxide, tellurium dioxide, lithium sulfide, lithium nitride, lithium nitrate, lithium carbonate, lithium fluoride, lithium chloride, lithium bromide, lithium carbide, lithium borate, lithium sulfate, lithium hexafluorophosphate, lithium hydroxide, lithium tantalite, lithium iodide, lithium tetrakispentafluorophenyl borate, yttrium lithium fluoride, polyethylene glycol, gelatin, or polytetrafluoroethylene, or any combination thereof. The thickness of the coating can range from 0.1 nanometers to 50 microns. In some embodiments, the thickness can range from 0.5 nm to 500 nm.

In one example, the present disclosure provides a method of preparing advanced dielectric materials coated metal foils. The coated metal foils can be used as the anode of lithium-ion batteries, wherein the method comprises: employing (that is, providing or obtaining) metal foils such as commercial metal foils, including copper, stainless steel and nickel foils, optionally with a treatment, such as cleaning of the foils by acids and organics to remove oxide and organics residues, respectively. The method also comprises applying the coating materials described above using film deposition methods, such as CVD, PECVD, ALD, sputtering, PVD, PEALD, spinning coating, dip coating, PLD, to make a coating onto the metal foils, such as Cu, Ni or stainless steel. The coating material is dielectric, and can be selected from the coating materials disclosed herein.

In some embodiments, the coating thickness can range from 0.1 nanometers to 50 microns, preferably from 0.5 nm to 500 nm. The metal foil thickness can range from 0.1 μm to 50 μm.

In another example, the present disclosure provides a method of preparing advanced dielectric materials with high Li-ion conductivity coated metal foils as the anode of lithium-ion batteries, wherein the method comprises: employing metal foils such as commercial metal foils, including copper, stainless steel and nickel foils, optionally with a treatment, such as cleaning of the foils by acids and organics to remove oxide and organics residues, respectively; and using the technical methods, such as CVD, PECVD, ALD, sputtering, PVD, PEALD, spinning coating, dip coating, PLD, to make a coating onto the metal foils, such as Cu, Ni or stainless steel.

The coating material is dielectric and has high lithium-ion conductivity. The coating material can comprise a lithium-incorporated compound, including but not limited to lithium phosphorus oxynitride (LiPON), $Li_3YCl_6$, $Li_3YBr$, $LisS_3N$, $Li_{1+x}Al_xGeyTi_{2-x-y}(PO_4)_2$ (0≤x≤0.8; y=0.8, 1.0), $Li_7La_3Zr_2O_{12}$, Al-doped $Li_7La_3Zr_2O_{12}$, $Li(NH_3)_nBH_4$ (0<n≤2), $LiCoO_2$, $LiMn_2O_4$, $LiFePO_4$, $Li_{14}ZnGe_4O_{16}$, lithium lanthanum titanate, $Li_{10}GeP_2S_{12}$, $Li_{1+x}Ge_{2-y}Al_yP_3O_{12}$, $LisS_9P_2$, $Li_3FCO_3$ or any combination thereof.

The coating thickness can range from 0.1 nanometers to 50 microns, preferably from 0.5 nm to 500 nm. The metal foil thickness can range from 0.1 μm to 50 μm.

In some embodiments of the present disclosure, the prepared coating is substantially homogeneous and uniform in compositions and thickness.

As another aspect, method of preparing a thin layer comprising lithium are provided. The thin layer can be used as a metal anode in a lithium battery, or may be a part of an anode. The method comprises: a) applying one or more interlayer material onto a substrate to form an interlayer material coated substrate. The interlayer material can comprise a metal such as aluminum metal, tin metal, indium metal, zinc metal, nickel metal, molybdenum metal and titanium metal, or any metal oxide or metal nitride, such as $Al_2O_3$, CuO, ZnO, $TiO_2$, $HfO_2$, aluminum nitride (AlN), $Li_2O$, $SiO_2$, $NbO_2$, $Fe_2O_3$, $Fe_3O_4$, FeO, $MnO_2$, $Li_3N$, $Li_2CO_3$, $Si_3N_4$ and $Nb_3N_4$, or any organic materials such as carbonates and ester, or silicon, or any combination thereof. The substrate can comprise copper (Cu) foil, nickel (Ni) foil, stainless steel foil, titanium (Ti) foil, carbon or graphite clothing, tantalum (Ta) foil, tungsten (W) foil, vanadium (V) foil, or a polymer film. In some embodiments, the total thickness of the interlayer material layer is 0.1 nm-50 μm, wherein the substrate has a thickness of 1.0-45 μm. The method also comprises b) applying heat to the interlayer material coated substrate to an elevated temperature, for example 200 celsius (° C.), or between 100 and 250° C., or from 150 to 225° C.; and c) applying one or more metal layer onto the interlayer material coated substrate. The metal can be lithium and can be integrated onto the interlayer. In some embodiments, the total thickness of the metal layer is 10 nm-100 nm.

Suitable processes of applying the one or more metal layer onto the interlayer material coated substrate include but are not limited to pressing, rolling, printing and extruding.

The interlayer material can be applied by a method comprising chemical vapor deposition, plasma enhanced chemical vapor deposition, sputtering, physical vapor deposition, atomic layer deposition, plasma enhanced atomic layer deposition, spinning coating, dip coating, pulsed laser deposition, or any combination thereof. In some embodiments, the interlayer material layer is applied by physical vapor deposition or atomic layer deposition.

In some aspects, the present methods are used to form an ultrathin layer of lithium, and the metal layer can be peeled off from the substrate to provide substrate free metal film.

In some embodiments, the interlayer material comprises aluminum metal, and the interlayer material has a thickness of 20 nm to several microns. In some embodiments, the substrate comprises a copper foil with a thickness of 5-20 μm, alternatively 1-20 μm, and/or the metal layer comprises a lithium layer with a thickness of 1-50 μm.

In some embodiments, the metal coated substrate is prepared without being under vacuum, for example, at atmospheric conditions. The present disclosure provides an anode comprising a lithium metal based material having a surface layer material comprising: a thin layer comprising an interlayer material; wherein: the anode is configured for use as the anode of a lithium-ion battery or lithium-sulfur battery.

The present methods provide great adhesion between lithium and current collectors, and high lithium density with good edge are accomplished. The lithium manufacturing process can be achieved by roll-to-roll process or extrude printing or 3D printing with integration of the physical or chemical vapor technology. Also, some coating materials by the chemical vapor technology as the interlayer onto the current collectors can be used to protect the thin lithium metal, including lithium metal oxides (lithium niobium oxides, lithium hafnium oxides and lithium lanthanum oxides, etc.), or the combination of two or three of these metal oxides.

In some embodiments, the lithium thickness in the metal layer of the anode or the ultrathin lithium layer ranges from 10 μm to 100 μm, and/or the anode material is a thin lithium metal that is either formed on current collectors, including copper and nickel, or free-standing lithium. In some embodiments, when there is a substrate, the substrate and the lithium metal are surface treated by chemical vapor or physical vapor to manipulate the surface so that they are able to be integrated together with low resistance. In some embodiments, the lithium and the substrate are integrated with a roll-to-roll process.

In some embodiments, the layer material comprises a metal oxide, a metal halide, a metal oxyfluoride, a metal nitride, a metal carbonate, a metal sulfide, a metal sulfate, a metal phosphate, a non-metal oxide, a non-metal carbide, a carbon material, or a mixture of any two or more thereof. For example, the layer material can comprise $Li_2O$, $La_2O_3$, $NbO_2$, $ZrO_2$, $HfO_2$, $GaO_2$, $GeO_2$, $CeO_2$, MgO, CaO, $Li_3OF$, LiF, $AlF_3$, $MgF_2$, $Zn_2OF_2$, $Li_3FO$, $LiCF_5$, $Li_3N$, TiN, $Li_2CO_3$, $CaCO_3$, $ZnCO_3$, $La_2(CO_3)_3$, Nb $(CO_3)_2$, $MgCO_3$, $Li_2S$, ZnS, $GaS_2$, $TiS_2$, $NbS_2$, $HfS_2$, CaS, $La_2S_3$, $BaSO_4$, $Li_3PO_4$, $AlPO_4$, $WF_4$, $W(PO_4)_2$, SiC, carbon or a mixture of any two or more thereof.

The thin layer of the anode may comprise two or more layers of the inert material, and the thin layer may be deposited in one or multiple times or cycles. The thin layer can be deposited by atomic layer deposition or chemical vapor deposition.

The depositing of the thin layer can comprise providing an inert material precursor configured to decompose or react in the depositing to form the inert material. By way of example, the inert material precursor can be selected from trimethylaluminum, $AlCl_3$, tris-(dimethylamido)aluminum, trialkylaluminum, trifluoroaluminum, trichloroaluminum, tribromoaluminum, $AlMe_2Cl$, $AlMe_2OPr$, $Al(OEt)_3$, $Al(OPr)_3$, $ZrCl_3$, $ZrCl_4$, $ZrI_4$, $ZrCp_2Cl_2$, $ZrCp_2Me_2$, Zirconium tert-butoxide or called $Zr(OtBu)_4$, $Zr(dmae)_4$, $Zr(thd)_4$, $Zr(NMe_2)_4$, $Zr(NEt_2)_4$, $Zr(OPr)_2(dmae)_2$, $Zr(OtBu)_2(dmae)_2$, $Zr(NEtMe)_4$, $ZnCl_2$, $ZnEt_2$, $ZnMe_2$, $Zn(OAc)_2$, $SiCl_4$, $SiCl_3H$, $SiCl_2H_2$, Bis(trimethylsilyl)amine, $Si(NCO)_4$, $MeOSi(NCO)_3$, $GeCl_4$, $MgCp_2$, $Mg(thd)_2$, $TiCl_4$, $TiI_4$, $Ti(OMe)_4$, $Ti(OEt)_4$, $Ti(OPr)_4$, $Ti(OPr)_2(dmae)_2$, $Ti(OBu)_4$, or $Ti(NMe_2)_4$, tris(iso-propylcyclopentadienyl)

lanthanum, La(TMHD)$_3$, TDMASn, TDMAHf, HfCl$_4$, LiOtBu, CO$_2$, water, oxygen, ozone, hydrogen fluoride, hydrogen fluoride pyridine, tungsten hexafluoride, (tert-butylimido)-tris(diethylamino)-niobium or called tBuN=Nb(NEt$_2$)$_3$, tBuN=Nb(NMeEt)$_3$, H$_2$S, bis-(tri-Isopropylcyclopentadienyl)calcium, disilane (Si$_2$H$_6$), silane (SiH$_4$), monochlorosilane (SiH$_3$Cl), C$_2$H$_2$, CCl$_4$, or CHCl$_3$. The inert material precursors can be manipulated or otherwise selected to tune the element ratio in the material. In some embodiments, the inert material precursors are metal organics and the material synthesis can be realized at low temperature (30° C. to 160° C.).

For the present anode, the anode material can be thin lithium metal. The lithium metal can be formed on current collectors, such as copper. By special treatments on lithium metal or the current collector using the chemical vapor technology, lithium and the current collectors can be integrated together, and the lithium metal is formed with a thickness from 1 μm to 200 μm. The lithium manufacturing process can be achieved by roll-to-roll process with integration of the chemical vapor technology. Also, some coating materials by the chemical vapor technology are used to protect the thin lithium metal, including lithium metal oxides (lithium niobium oxides, lithium hafnium oxides, lithium lanthanum oxides, and others), or the combination of two, three, or more of these metal oxides.

As noted above, spatial atomic layer deposition (SALD) is based on separating the precursors in space rather than in time. This can improve the efficiency of ALD precursor dosing and pump usage so as to reduce the cost and maintenance of applying the thin layers. With this continuous and efficient roll-to-roll process contemplated herein, fast production (>5 meters/min) can be accomplished for large scale production, and the cost of material production can be decreased significantly to achieve the cost of final battery products at relatively low cost.

Figure 7:
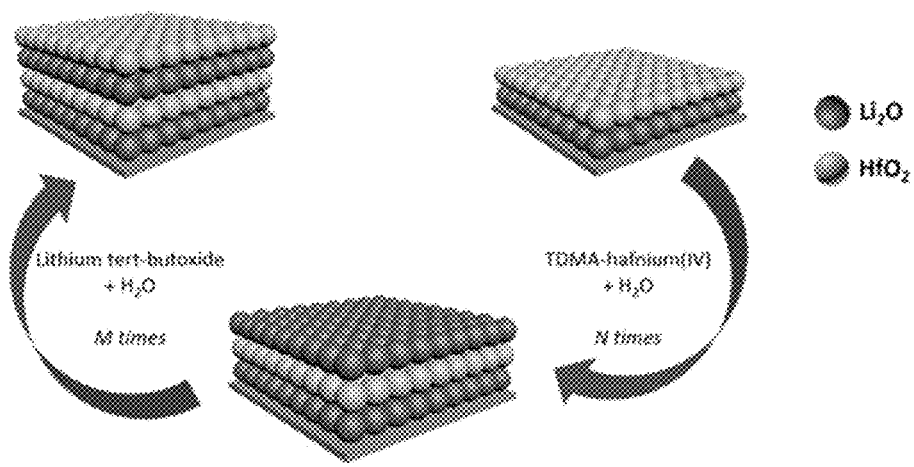
FIG. 7 shows a synthesis schematic for one cycle process of ALD $Li_xHfO_2$, using TDMA-Hf, $H_2O$ and LTB as the precursors.
Figure 8:
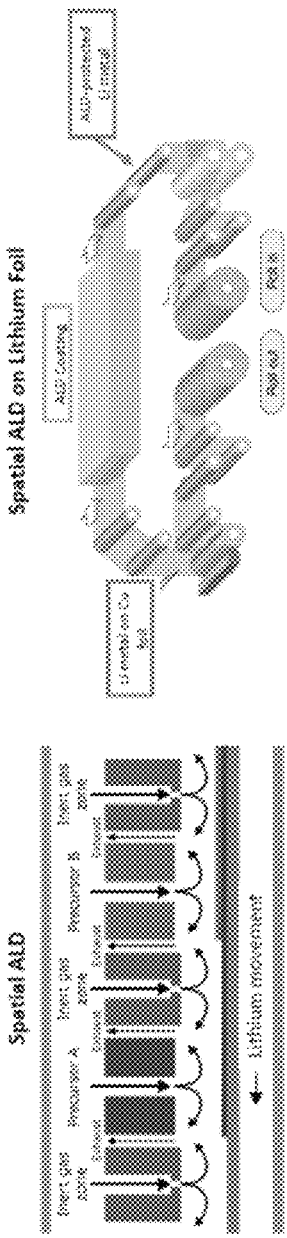
FIG. 8 illustrates a manufacturing process example for a spatial ALD and roll-to-roll (R2R) process for making coatings on anodes and components according to the present disclosure.

The present methods can be used to prepare a coated lithium layer, suitable for use as a metal anode in a lithium battery or for other uses where an ultrathin lithium is desired. The method comprises depositing a coating material on a lithium layer by a roll-to-roll process, extrude printing, 3D printing or any other depositing technique. The depositing can comprise spatial atomic layer deposition (SALD) in a roll-to-roll process. By way of example, the roll-to-roll process can comprise unspooling the lithium layer from a first roll, passing the lithium layer through a plurality of deposition zones, and spooling the coated lithium layer on a second roll. FIG. 7 illustrates an exemplary spatial ALD and roll-to-roll (R2R) process for making the metal anodes and metal cathodes described herein with high efficiency and reduced cost compared to conventional ALD processes. The plurality of deposition zone can comprise at least a first deposition zone comprising a first coating material precursor that reacts or decomposes on the lithium layer, and a second deposition zone comprising a second coating material precursor that reacts or decomposes on the first coating material precursor. For example, the first coating material precursor can be tetrakis(dimethylamido)hafnium and the second coating material precursor can be water. In some embodiments, the coating material comprises a metal oxide, a metal halide, a metal oxyfluoride, a metal nitride, a metal carbonate, a metal sulfide, a metal sulfate, a metal phosphate, a non-metal oxide, a non-metal carbide, a carbon material, or a mixture of any two or more thereof. More particularly, the coating material can comprise Li$_2$O, La$_2$O$_3$, NbO$_2$, ZrO$_2$, HfO$_2$, GaO$_2$, GeO$_2$, CeO$_2$, MgO, CaO, Li$_3$OF, LiF, AlF$_3$, MgF$_2$, Zn$_2$OF$_2$, Li$_3$FO, LiCF$_5$, Li$_3$N, TiN, Li$_2$CO$_3$, CaCO$_3$, ZnCO$_3$, La$_2$(CO$_3$)$_3$, Nb(CO$_3$)$_2$, MgCO$_3$, Li$_2$S, ZnS, GaS$_2$, TiS$_2$, NbS$_2$, HfS$_2$, CaS, La$_2$S$_3$, BaSO$_4$, Li$_3$PO$_4$, AlPO$_4$, WF$_4$, W(PO$_4$)$_2$, SiC, carbon or a mixture of any two or more thereof.

The metal anodes, cathodes, and other components described herein can be incorporated into batteries or other electrochemical cells. For example, the metal anodes, cathodes, and other components can be assembled into various battery designs such as cylindrical batteries, prismatic shaped batteries, coin cell batteries, or other battery shapes. The batteries can comprise a single pair of electrodes or a plurality of pairs of electrodes assembled in parallel and/or series electrical connection(s). While the materials described herein can be used in batteries for primary, or single charge use, the metal anodes, cathodes, and other components generally have desirable properties for incorporation in secondary batteries (or rechargeable batteries) which are capable of use over multiple cycles of charge and discharge. The batteries can be configured as coin cells, pouch cells, or other cells.

The batteries and electrochemical cells described herein will comprise one or more electrolytes, which may be liquid, solid or other form.

In some embodiments, a battery comprises an electrode as described herein, and a solid electrolyte interphase (SEI) formed by or on the protective coating.

As used herein, and in addition to their ordinary meanings, the terms "substantial" or "substantially" mean to within acceptable limits or degree to one having ordinary skill in the art. For example, "substantially cancelled" means that one skilled in the art considers the cancellation to be acceptable. In the present disclosure the term "substantially" can allow for a degree of variability in a value or range, for example, within 80%, within 85%, within 90%, within 95%, or within 99% of a stated value or of a stated limit of a range.

As used herein, the terms "approximately" and "about" mean to within an acceptable limit or amount to one having ordinary skill in the art. For example, "about 10" may indicate a range of 8.5 to 11.5. For example, "approximately the same" means that one of ordinary skill in the art considers the items being compared to be the same. In the present disclosure the term "about" can allow for a degree of variability in a value or range, for example, within 20%, within 10%, within 5%, or within 1% of a stated value or of a stated limit of a range.

In the present disclosure, numeric ranges are inclusive of the numbers defining the range. It should be recognized that chemical structures and formula may be elongated or enlarged for illustrative purposes.

Whenever a range of the number of atoms in a structure is indicated (e.g., a $C_1$-$C_{24}$ alkyl, $C_2$-$C_{24}$ alkenyl, $C_2$-$C_{24}$ alkynyl, etc.), it is specifically contemplated that the substituent can be described by any of the carbon atoms in the sub-range or by any individual number of carbon atoms falling within the indicated range. By way of example, a description of the group such as an alkyl group using the recitation of a range of 1-24 carbon atoms (e.g., $C_1$-$C_{24}$), specifically describes an alkyl group having any of 1, 2, 3, 4, 5, 6, 7, 8, 9, 10, 11, 12, 13, 14, 15, 16, 17, 18, 19, 20, 21, 22, 23 and 24 carbon atoms, as appropriate, as well as any sub-range thereof (e.g., 1-2 carbon atoms, 1-3 carbon atoms, etc.).

Unless defined otherwise, all technical and scientific terms used herein have the same meaning as commonly understood by those working in the fields to which this disclosure pertain.

Before the various embodiments are described, it is to be understood that the teachings of this disclosure are not limited to the particular embodiments described, and as such can, of course, vary. It is also to be understood that the terminology used herein is for the purpose of describing particular embodiments only, and is not intended to be limiting, since the scope of the present teachings will be limited only by the appended claims.

As disclosed herein, a number of ranges of values are provided. It is understood that each intervening value, to the tenth of the unit of the lower limit, unless the context clearly dictates otherwise, between the upper and lower limits of that range is also specifically disclosed. Each smaller range between any stated value or intervening value in a stated range and any other stated or intervening value in that stated range is encompassed within the invention. The upper and lower limits of these smaller ranges may independently be included or excluded in the range, and each range where either, neither, or both limits are included in the smaller ranges is also encompassed within the invention, subject to any specifically excluded limit in the stated range. Where the stated range includes one or both of the limits, ranges excluding either or both of those included limits are also included in the invention.

Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the present teachings, some exemplary methods and materials are now described.

All patents and publications referred to herein are expressly incorporated by reference.

As used in the specification and appended claims, the terms "a," "an," and "the" include both singular and plural referents, unless the context clearly dictates otherwise. Thus, for example, "a layer" includes one layer and plural layers. The term "or" between alternatives includes "and/or", unless the context clearly dictates that only one alternative can be present.

In view of this disclosure it is noted that the methods can be implemented in keeping with the present teachings. Further, the various components, materials, structures and parameters are included by way of illustration and example only and not in any limiting sense. In view of this disclosure, the present teachings can be implemented in other applications and components, materials, structures and equipment to implement these applications can be determined, while remaining within the scope of the appended claims.

Exemplary Embodiments

To assist in understanding the scope and benefits of the present invention, the following description of exemplary or preferred embodiments is provided. The exemplary embodiments should be taken as illustrating, rather than as limiting, the present invention as defined by the claims. As will be readily appreciated, numerous variations and combinations of the features set forth above can be utilized without departing from the present invention as set forth in the claims. Such variations are not regarded as a departure from the scope of the invention, and all such variations are intended to be included within the scope of the following claims.

Embodiment 1. A metal anode having a protective coating comprising a metal layer comprising lithium, sodium, or potassium; and a protective coating on the metal layer, wherein the protective coating comprises a composite material, and the composite material comprises an oxide or fluoride of lithium, sodium, or potassium.

Embodiment 2. The metal anode of embodiment 1, wherein the composite material comprises lithium fluoride-lithium oxide ($LiF$—$Li_2O$), lithium fluoride-lithium carbonate ($LiF$—$Li_2CO_3$), lithium fluoride-lithium hexafluorophosphate ($LiF$—$LiPF_6$), lithium fluoride-lithium phosphate ($LiF$—$LiPO_4$), lithium fluoride-lithium tetrafluoroborate ($LiF$—$LiBF_4$), lithium fluoride-carbon fluoride ($LiF$—$CF_4$), $Li_2O$—$Li_2CO_3$, $Li_2O$—$LiF$, $Li_2O$—$LiPO_4$, $Li_2O$—$LiBF_4$, $Li_2O$—$CF_4$, $HfO_2$, $Li_xHfO_2$, $SiO_2$, $LiF$—$NbO_2$, $Li_3N$—$AlN$, $Li_xSi_3N_4$, $Li_xNb_3N_4$, or any combination of these materials.

Embodiment 3. The metal anode of embodiment 1, wherein the composite material comprises (a) a lithium oxide-containing material when the metal layer comprises lithium; (b) a sodium oxide-containing material when the metal layer comprises sodium; or (c) a potassium oxide-containing material when the metal layer comprises potassium.

Embodiment 4. The metal anode of embodiment 3, wherein the composite material comprises (a) $Li_2O$—$Li_2CO_3$, $Li_2O$—$LiF$, $Li_2O$—$LiPO_4$, $Li_2O$—$LiBF_4$, $Li_2O$—$CF_4$, or any combination of these materials when the metal layer comprises lithium; (b) $Na_2O$—$Na_2CO_3$, $Na_2O$—$NaF$, $Na_2O$—$NaPO_4$, $Na_2O$—$NaBF_4$, $Na_2O$—$CF_4$, or any combination of these materials when the metal layer comprises sodium, and (c) $K_2O$—$K_2CO_3$, $K_2O$—$KF$, $K_2O$—$KPO_4$, $K_2O$—$KBF_4$, $K_2O$—$CF_4$, or any combination of these materials when the metal layer comprises potassium.

Embodiment 5. The metal anode of any of embodiments 1 to 4, wherein the protective layer comprises $HfO_2$, $M_xHfO_2$, $SiO_2$, $MF$-$M_2O$, $MF$-$M_2CO_3$, $MF$-$MPF_6$, $MF$-$M_3PO_4$, $MF$-$MBF_4$, $MF$-$CF_4$, $MF$-$NbO_2$, $M_2O$-$M_2CO_3$, $M_2O$-$MF$, $M_2O$-$M_3PO_4$, $M_2O$-$MBF_4$, $M_2O$—$CF_4$, $M_3N$—$AlN$, $MN$-$AN$, $M_xSi_3N_4$, $M_xNb_3N_4$, or any combination thereof, where $X \geq 1$ and M is Li, Na, K, or a mixture thereof.

Embodiment 6. The metal anode of any of embodiments 1 to 5, wherein the metal layer of the metal anode has a thickness of 10 μm to 150 μm.

Embodiment 7. The metal anode of any of embodiments 1 to 6, wherein the protective coating has a thickness from 1 nm to 10 microns.

Embodiment 8. The metal anode of any of embodiments 1 to 7, wherein the protective coating is formed on the metal layer by atomic layer deposition, plasma enhanced atomic layer deposition, chemical vapor deposition, plasma enhanced chemical vapor deposition, sputtering, physical vapor deposition, spinning coating, dip coating, or pulsed laser deposition.

Embodiment 9. A lithium-free metal or carbon electrode for a lithium ion battery, the electrode comprising: a metal or carbon layer, a protective coating on the metal layer, wherein the protective coating include but not limited to aluminum oxide, titanium oxide, hafnium oxide, zirconium dioxide, lithium oxide, lanthanum oxide, zinc oxide, antimony tetroxide, antimony pentoxide, arsenic trioxide, arsenic pentoxide, barium oxide, bismuth oxide, bismuth oxide, calcium oxide, cerium oxide, cerium oxide, chromium oxide, chromium oxide, chromium oxide, chromium oxide, cobalt oxide, cobalt oxide, cobalt oxide, copper oxide, copper oxide, iron oxide, iron oxide, lead oxide, magnesium oxide, manganese oxide, mercury oxide, nickel oxide, rubidium oxide, silicon dioxide, silver oxide, thallium oxide, thallium oxide, thorium oxide, tin oxide, uranium oxide, tungsten oxide, selenium dioxide, tellurium dioxide, lithium sulfide, lithium nitride, lithium nitrate, lithium carbonate, lithium fluoride, lithium chloride, lithium bromide, lithium carbide, lithium borate, lithium sulfate, lithium hexafluorophosphate, lithium hydroxide, lithium tantalite, lithium iodide, lithium tetrakispentafluorophenyl borate, yttrium lithium fluoride, polyethylene glycol, gelatin, lithium hafnium oxide, a lithium fluoride-lithium carbonate composite or polytetrafluoroethylene, or any combination thereof.

Embodiment 9a. An electrode for a lithium ion battery, the electrode comprising: a metal layer; a protective coating on the metal layer, wherein the protective coating comprises hafnium oxide, lithium hafnium oxide, a lithium fluoride-lithium carbonate composite, or a combination thereof.

Embodiment 10. The electrode of embodiment 9 or 9a, wherein the metal layer is lithium or copper.

Embodiment 10a. The electrode of embodiment 9 or 9a, wherein the metal layer is copper, nickel, titanium, carbon or graphite layer, tantalum (Ta) foil, tungsten (W) foil, vanadium (V) foil, or stainless steel or any combination thereof.

Embodiment 11. The electrode of embodiment 9 or 9a, wherein the protective coating is formed by atomic layer deposition or plasma enhanced atomic layer deposition.

Embodiment 11a. The electrode of embodiment 9 or 9a, wherein the protective coating is formed by atomic layer deposition, chemical vapor deposition, plasma enhanced chemical vapor deposition, physical vapor deposition, pulsed laser deposition or plasma enhanced atomic layer deposition.

Embodiment 12. The electrode of embodiment 9 or 9a, wherein the thickness of the protective coating can range from 0.1 nanometers to 50 microns, with particular interest of the thickness from 0.5 nm to 10 microns. The metal foil thickness can range from 0.1 µm to 50 µm.

Embodiment 13. A cathode comprising a metal layer having a surface and comprising a lithium-based material; an inert material on the surface of the metal layer; wherein the cathode is configured for use as the cathode of a lithium-ion battery or lithium-sulfur battery.

Embodiment 14. The cathode of embodiment 13, wherein the inert material comprises a metal, a metal oxide, a metal halide, a metal oxyfluoride, a metal nitride, a metal carbonate, a metal sulfide, a metal sulfate, a metal phosphate, a non-metal oxide, a non-metal carbide, a non-metal, or mixture of any two or more thereof.

Embodiment 15. The cathode of embodiment 13, wherein the inert material comprises a material selected from the group consisting of Al, Cu, $Al_2O_3$, $TiO_2$, ZnO, $La_2O$, $NbO_2$, $ZrO_2$, $Li_2O$, $HfO_2$, $GaO_2$, $GeO_2$, $CeO_2$, MgO, CaO, LiF, $AlF_3$, $LiAlF_4$, $MgF_2$, $Zn_2OF_2$, $Li_3FO$, $LiCF_5$, $Li_3N$, TiN, $Li_2CO_3$, $CaCO_3$, $ZnCO_3$, $La_2(CO_3)_3$, Nb $(CO_3)_2$, $MgCO_3$, $Li_2S$, ZnS, $GaS_2$, $TiS_2$, $NbS_2$, $HfS_2$, CaS, $La_2S_3$, $BaSO_4$, $Li_3PO_4$, $AlPO_4$, $WF_4$, $W(PO_4)_2$, $SiO_2$, SiC, Si, carbon, or mixtures of any two or more thereof.

Embodiment 16. The cathode of embodiment 13, wherein the metal layer comprises $Li_XNi_YMn_ZCo_NO_2$ (NMC, X≥1, Y≥0.6, Z≥0.1, N≥0), $Li_XNi_YM_NNO_2$ (NMO, X≥1, Y≥0.2, N≥0.2), or $Li_XNi_YCo_ZAl_NO_2$ (NCA, X≥1, Y≥0.6, Z≥0, N≥0.01), optionally with a dopant.

Embodiment 16a. The cathode of embodiment 13, wherein the metal layer comprises lithium sulfide ($Li_2S$), and the inert material comprises a lithium metal oxide (e.g., lithium niobium oxides, lithium hafnium oxides and lithium lanthanum oxides, etc.), lithium oxide ($Li_2O$), lithium phosphate ($Li_3PO_4$), lithium silicon oxide, lithium aluminum phosphate ($Li_xAlPO_4$), and lithium fluoride based materials, including but not limited to LiF, lithium aluminum fluoride ($Li_xAlF_y$), lithium tungsten aluminum fluoride ($Li_xWAlF_y$), lithium fluoride-lithium oxide (LiF—$Li_2O$), lithium fluoride-lithium carbonate (LiF—$Li_2CO_3$), lithium fluoride-lithium hexafluorophosphate (LiF—$LiPF_6$), lithium fluoride-lithium phosphate (LiF—$LiPO_4$), lithium fluoride-lithium tetrafluoroborate (LiF—$LiBF_4$) and lithium fluoride-carbon fluoride (LiF—$CF_4$), or any combination thereof.

Embodiment 16b. A battery comprising an electrode (an anode or a cathode) of any of the foregoing embodiments, and a solid electrolyte interphase (SEI) formed by or on the protective coating.

Embodiment 17. A process for preparing the cathode of embodiment 13 or other cathode described herein. The process comprises depositing a thin layer of the inert material onto the surface of the metal layer by atomic layer deposition, plasma enhanced atomic layer deposition, chemical vapor deposition, plasma enhanced chemical vapor deposition, sputtering, physical vapor deposition, spinning coating, dip coating, or pulsed laser deposition.

Embodiment 18. The process of embodiment 17, further comprising forming the metal layer from a cathode material powder.

Embodiment 19. The process of embodiment 18, wherein the cathode material powder has a mean particle size from 50 nm to 50 pun.

Embodiment 20. The process of embodiment 18 or 19, further comprising forming the cathode material powder by a sol-gel method, solid state reaction, ultrasonic spray pyrolysis, flame-assisted pyrolysis, liquid-feed flame spray pyrolysis, or co-precipitation.

Embodiment 21. The process of embodiment 18, 19, or 20, wherein the cathode material comprises sulfur or lithium sulfide powders.

Embodiment 22. The process of any of embodiments 18 to 21, further comprising forming the metal layer by mixing the cathode material with a binder and conductive additives to form a laminate.

Embodiment 22a. The process of embodiment 22, wherein the cathode material, the binder, and the conductive additivies cast onto a current collector before forming the laminate.

Embodiment 23. The process of embodiment 17, wherein the inert material is deposited in multiple cycles by atomic layer deposition or chemical vapor deposition.

Embodiment 24. The process of embodiment 17, wherein the inert material is deposited by depositing inert material precursors.

Embodiment 25. The process of embodiment 24, wherein the inert material precursors are metal organics, and the inert material is deposited at a temperature from 80° C. to 300° C.

Embodiment 26. The process of embodiment 24, wherein the inert material precursors are inorganic and the inert material is deposited at a temperature from 500° C. to 1200° C.

Embodiment 27. The process of embodiment 24, wherein the inert material precursors are selected from trimethylaluminum, $AlCl_3$, tris-(dimethylamido)aluminum, trialkylaluminum, trifluoroaluminum, trichloroaluminum, tribromoaluminum, $AlMe_2Cl$, $AlMe_2OPr$, $Al(OEt)_3$, $Al(OPr)_3$, $ZrCl_3$, $ZrCl_4$, $ZrI_4$, $ZrCp_2C_2$, $ZrCp_2Me_2$, Zirconium tert-butoxide or called $Zr(OtBu)_4$, $Zr(dmae)_4$, $Zr(thd)_4$, $Zr(NMe_2)_4$, $Zr(NEt_2)_4$, $Zr(OPr)_2(dmae)_2$, $Zr(OtBu)_2(dmae)_2$, $Zr(NEtMe)_4$, $ZnCl_2$, $ZnEt_2$, $ZnMe_2$, $Zn(OAc)_2$, $SiCl_4$, $SiCl_3H$, $SiCl_3H_2$, Bis(trimethylsilyl)amine, $Si(NCO)_4$, $MeOSi(NCO)_3$, $GeCl_4$, $MgCp_2$, $Mg(thd)_2$, $TiCl_4$, $TiI_4$, $Ti(OMe)_4$, $Ti(OEt)_4$, $Ti(OPr)_4$, $Ti(OPr)_2(dmae)_2$, $Ti(OBu)_4$, or $Ti(NMe_2)_4$, tris(iso-propylcyclopentadienyl) lanthanum, $La(TMHD)_3$, TDMASn, TDMAHf, $HfCl_4$, LiOtBu, $CO_2$, water, oxygen, ozone, hydrogen fluoride, hydrogen fluoride pyridine, tungsten hexafluoride, (tert-butylimido)-tris(diethylamino)-niobium or called tBuN=Nb $(NEt_2)_3$, tBuN=Nb(NMeEt)$_3$, H2S, bis-(tri-Isopropylcyclo-pentadienyl)calcium, disilane ($Si_2H_6$), silane ($SiH_4$), monochlorosilane ($SiH_3Cl$), $C_2H_2$, $CCl_4$, $CHCl_3$, and mixtures thereof.

Embodiment 28. A method of preparing an anode configured for use in a lithium-ion battery, the method comprising depositing a coating material on a metal substrate by atomic layer deposition (ALD), chemical vapor deposition (CVD), plasma enhanced chemical vapor deposition (PECVD), sputtering, physical vapor deposition (PVD), plasma enhanced atomic layer deposition (PEALD), spinning coating, dip coating, pulsed laser deposition (PLD), or any combination thereof; wherein the coating material is dielectric and lithium-ion conductive.

Embodiment 29. The method of embodiment 28, wherein the metal substrate comprises copper, nickel, titanium, carbon or graphite, tantalum, tungsten, vanadium, or stainless steel or any combination thereof.

Embodiment 30. The method of embodiment 28 or 29, wherein the metal substrate has a thickness of from 0.1 microns to 50 microns.

Embodiment 31. The method of any of embodiments 28 to 30, wherein the coating material comprises aluminum oxide, titanium oxide, hafnium oxide, zirconium dioxide, lithium oxide, lanthanum oxide, zinc oxide, antimony tetroxide, antimony pentoxide, arsenic trioxide, arsenic pentoxide, barium oxide, bismuth oxide, bismuth oxide, calcium oxide, cerium oxide, cerium oxide, chromium oxide, chromium oxide, chromium oxide, chromium oxide, cobalt oxide, cobalt oxide, cobalt oxide, copper oxide, copper oxide, iron oxide, iron oxide, lead oxide, magnesium oxide, manganese oxide, mercury oxide, nickel oxide, rubidium oxide, silicon dioxide, silver oxide, thallium oxide, thallium oxide, thorium oxide, tin oxide, uranium oxide, tungsten oxide, selenium dioxide, tellurium dioxide, lithium sulfide, lithium nitride, lithium nitrate, lithium carbonate, lithium fluoride, lithium chloride, lithium bromide, lithium carbide, lithium borate, lithium sulfate, lithium hexafluorophosphate, lithium hydroxide, lithium tantalite, lithium iodide, lithium tetrakispentafluorophenyl borate, yttrium lithium fluoride, polyethylene glycol, gelatin, or polytetrafluoroethylene, or any combination thereof.

Embodiment 32. The method of any of embodiments 28 to 30, wherein the coating material comprises lithium phosphorus oxynitride (LiPON), $Li_3YCl_6$, $Li_3YBr_6$, $Li_9S_3N$, $Li_{1+x}Al_xGeyTi_{2-x-y}(PO_4)_3$ (0≤x≤0.8; y=0.8, 1.0), $Li_7La_3Zr_2O_{12}$, Al-doped $Li_7La_3Zr_2O_2$, $Li(NH_3)_nBH_4$ (0<n≤2), $LiCoO_2$, $LiMn_2O_4$, $LiFePO_4$, $Li_{14}ZnGe_4O_{16}$, lithium lanthanum titanate, $Li_{10}GeP_2S_{12}$, $Li_{1+x}Ge_{2-y}Al_yP_3O_{12}$, $LisS_9P_2$, $Li_3FCO_3$ or any combination thereof.

Embodiment 33. The method of any of embodiments 28 to 32, wherein the thickness of the coating material is from 0.1 nanometers to 50 microns.

Embodiment 34. The method of any of embodiments 28 or 30 to 33, wherein the metal substrate is a metal foil comprising copper, nickel, or stainless steel, and the method comprises treating the metal foil to remove oxide and organic residue before depositing the coating material.

Embodiment 35. A method of preparing a thin layer comprising lithium, the method comprising a) applying one or more interlayer material onto a substrate to form an interlayer material coated substrate; b) heating the interlayer material coated substrate to an elevated temperature; and c) applying one or more metal layers onto the interlayer material coated substrate, wherein the metal layer comprises lithium.

Embodiment 36. The method of embodiment 35, wherein the interlayer material comprises aluminum metal, tin metal, indium metal, zinc metal, nickel metal, molybdenum metal and titanium metal, or any metal oxide or metal nitride, such as $Al_2O_3$, CuO, ZnO, $TiO_2$, $HfO_2$, aluminum nitride (AlN), $Li_2O$, $SiO_2$, $NbO_2$, $Fe_2O_3$, $Fe_3O_4$, FeO, $MnO_2$, $Li_3N$, $Li_2CO_3$, $Si_3N_4$ and $Nb_3N_4$, or any organic material such as carbonates and esters, or silicon, or any combination thereof.

Embodiment 37. The method of embodiment 35 or 36, wherein the substrate comprises copper (Cu) foil, nickel (Ni) foil, stainless steel foil, titanium (Ti) foil, carbon or graphite clothing, tantalum (Ta) foil, tungsten (W) foil, vanadium (V) foil, or a polymer film. In some embodiments, the substrate is configured for use as a current collector of a lithium battery.

Embodiment 38. The method of any of embodiments 35 to 37, wherein the interlayer material has a thickness of 0.1 nm to 50 μm, and the substrate has a thickness of 1.0 μm to 45 μm.

Embodiment 39. The method of any of embodiments 35 to 38, wherein the metal layer has a thickness of from 10 nm to 100 microns.

Embodiment 40. The method of any of embodiments 35 to 39, wherein the elevated temperature is between 100 and 250° C.

Embodiment 41. The method of any of embodiments 35 to 40, wherein the metal layer is applied onto the interlayer material coated substrate by pressing rolling, printing or extruding.

Embodiment 42. The method of any of embodiments 35 to 41, wherein the interlayer material is applied to the substrate by chemical vapor deposition, plasma enhanced chemical vapor deposition, sputtering, physical vapor deposition, atomic layer deposition, plasma enhanced atomic layer deposition, spinning coating, dip coating, pulsed laser deposition, or any combination thereof.

Embodiment 43. The method of any of embodiments 35 to 42, further comprising peeling the metal layer from the substrate to provide a substrate-free metal film.

Embodiment 44. The method of any of embodiments 35 to 43, wherein the substrate is a current collector, or wherein the substrate is configured as a current collector.

Embodiment 45. The method of any of embodiments 35 to 44, wherein the one or more metal layers are applied without being under vacuum.

Embodiment 46. A method of preparing a coated lithium layer, the method comprising depositing a coating material on a lithium layer by a roll-to-roll process, extrude printing or 3D printing.

Embodiment 47. The method of embodiment 46, wherein the depositing comprises spatial atomic layer deposition (SALD) in a roll-to-roll process.

Embodiment 48. The method of embodiment 47, wherein the roll-to-roll process comprises unspooling the lithium layer from a first roll, passing the lithium layer through a plurality of deposition zones, and spooling the coated lithium layer on a second roll, wherein the plurality of deposition zone comprise at least a first deposition zone comprising a first coating material precursor that reacts or decomposes on the lithium layer, and a second deposition zone comprising a second coating material precursor that reacts or decomposes on the first coating material precursor.

Embodiment 49. The method of embodiment 48, wherein the first coating material precursor is tetrakis(dimethylamido)hafnium and the second coating material precursor is water.

Embodiment 50. The method of any of embodiments 46 to 49, wherein the coating material comprises a metal oxide, a metal halide, a metal oxyfluoride, a metal nitride, a metal carbonate, a metal sulfide, a metal sulfate, a metal phosphate, a non-metal oxide, a non-metal carbide, a carbon material, or a mixture of any two or more thereof.

Embodiment 51. The method of any of embodiments 46 to 49, wherein the coating material comprises $Li_2O$, $La_2O_3$, $NbO_2$, $ZrO_2$, $HfO_2$, $GaO_2$, $GeO_2$, $CeO_2$, MgO, CaO, $Li_3OF$, LiF, $AlF_3$, $MgF_2$, $Zn_2OF_2$, $Li_3FO$, $LiCF_5$, $Li_3N$, TiN, $Li_2CO_3$, $CaCO_3$, $ZnCO_3$, $La_2(CO_3)_3$, Nb $(CO_3)_2$, $MgCO_3$, $Li_2S$, ZnS, $GaS_2$, $TiS_2$, $NbS_2$, $HfS_2$, CaS, $La_2S_3$, $BaSO_4$, $Li_3PO_4$, $AlPO_4$, $WF_4$, $W(PO_4)_2$, SiC, carbon or a mixture of any two or more thereof.

EXAMPLES

Example 1

In this example, an $HfO_2$ coating is deposited on a copper substrate using Atomic Layer Deposition (ALD).

To prepare the $HfO_2$ coated Cu, copper foils are placed in the ALD reactors at 150° C. 50 cycles of ALD $HfO_2$, based on the reactions of tetrakis(dimethylamino) hafnium(IV) and water as the precursors, is deposited onto the Cu substrates. The thickness of $HfO_2$ is determined by ellipsometry, giving a thickness of 68 Å.

The $HfO_2$ coated Cu were tested as anodes in 2325-type coin cell batteries. The cathodes used in this test were NMC532 and NMC811, and the circle electrodes had diameter of 5/8 inch. The separator was Celgard 2325 membrane, and the electrolyte was concentrated 2 M lithium bis(trifluoromethanesulfonyl)imide and 2 M lithium difluoro(oxalato)borate in dimethoxyethane.

Figure 1B:
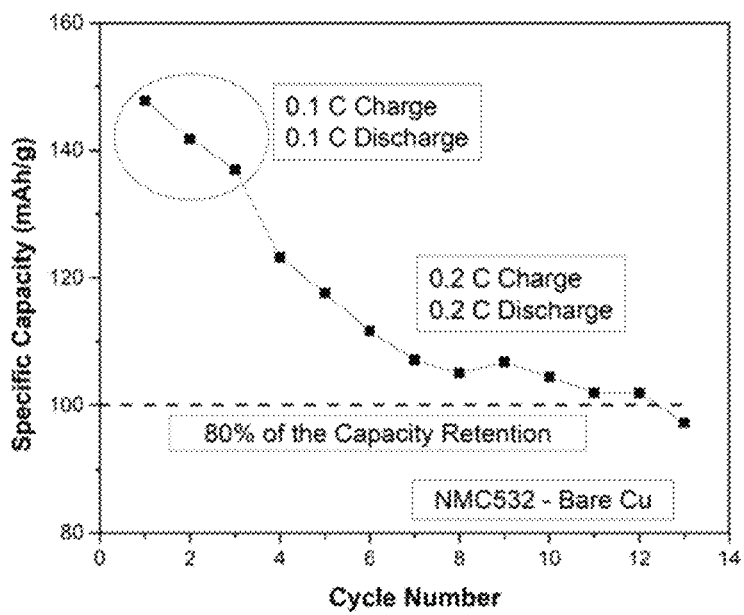
FIG. 1B shows the capacity of coin cells of Example 1 at 0.2 C, wherein the coin cells comprise ~5 mAh/cm$^2$ LiNiMnCoO$_2$ (Ni:Mn:Co=5:3:2), represented by NMC532, as the cathode and bare Cu as the anode.
Figure 2:
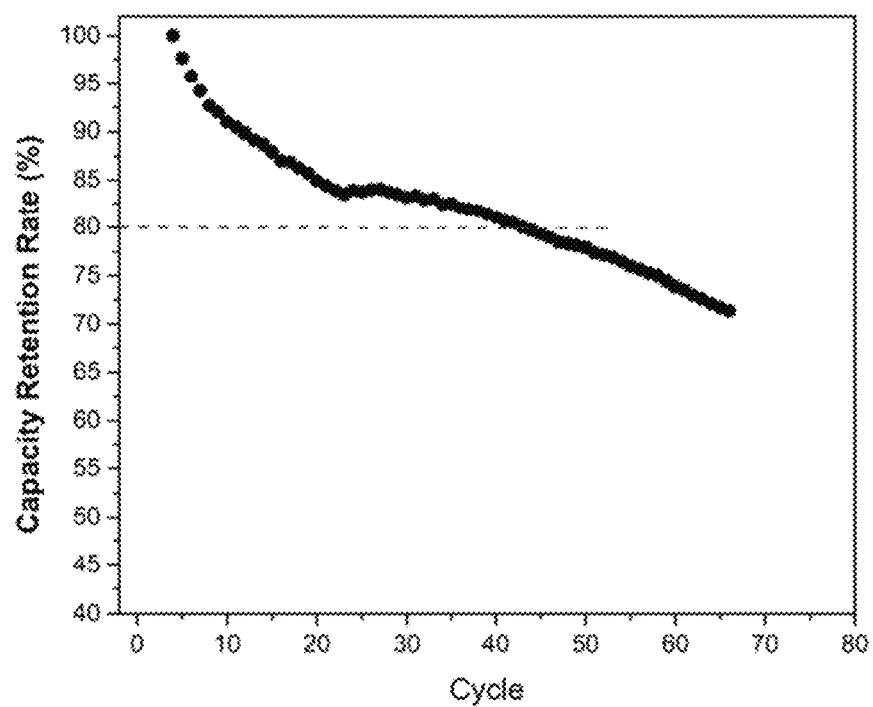
FIG. 2 shows the capacity retention rate of coin cells which comprise ~5 mAh/cm$^2$ LiNiMnCoO$_2$ (Ni:Mn:Co=5:3:2), represented by NMC532, as the cathode and HfO$_2$ coated Cu as the anode. The data are for Example 1 at 0.2 C.
Figure 3A:
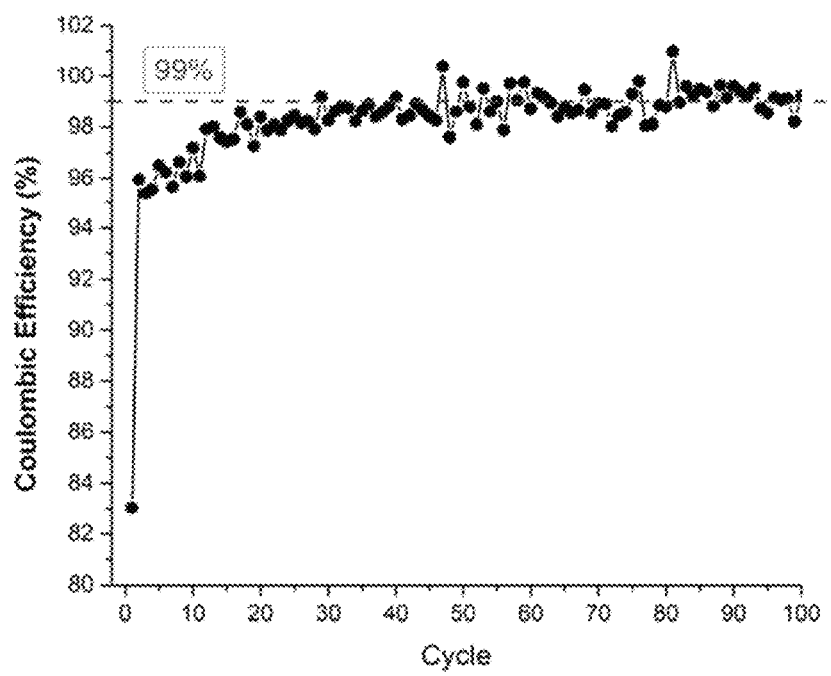
FIGS. 3A and 3B show the Coulombic efficiency of coin cells which comprise ~5 mAh/cm$^2$ LiNiMnCoO$_2$ (Ni:Mn:Co=5:3:2), represented by NMC532, as the cathode and HfO$_2$ coated Cu as the anode. The data are for Example 1 at 0.2 C.
Figure 3B:
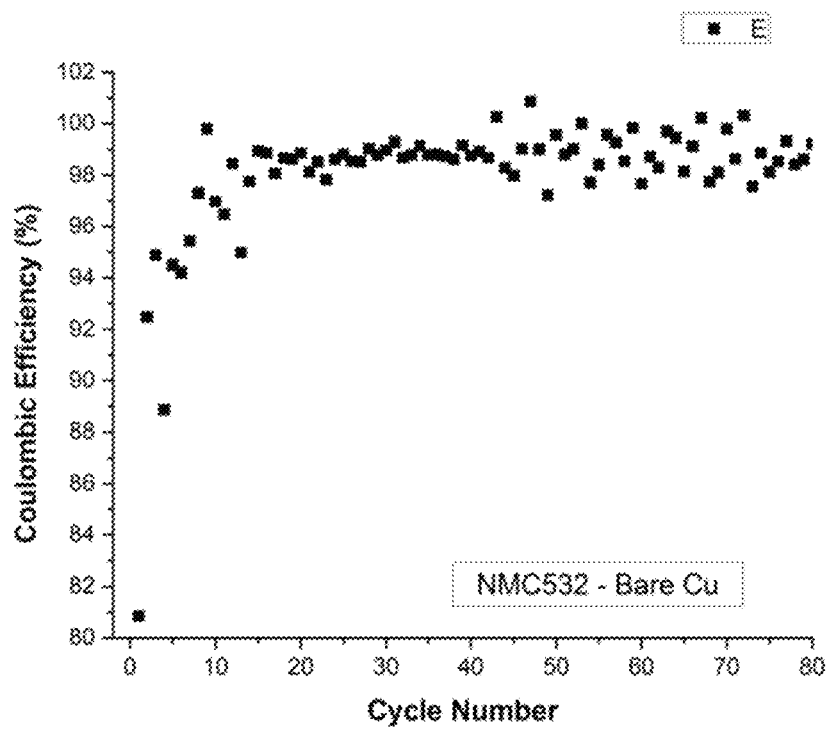

Performances of the $HfO_2$-coated Cu-metal anode and the bare Cu-metal anode paired with NMC532 cathodes were tested as follows. As shown in FIG. 1, the battery is charged and discharged in the first three cycles at 0.1 C, then 0.2 C was used for following cycles. The battery of $HfO_2$-coated Cu (FIG. 1A) shows a very promising result considering that there is no lithium on the anode side from the initial point and remained at 80% after about 50 cycles (FIG. 2). In comparison, when bare copper (FIG. 1B) was used as the anode with NMC532, the capacity decayed quickly, which shows that the battery decays to 80% of the capacity (the fourth cycle). From the Coulombic efficiency (CE) plotted in FIG. 3A, it is clear that with a very thin $HfO_2$ (~7 nm), the result is so stable and maintained at around 99%; while for the control sample as shown in the FIG. 3B, the bare copper anode demonstrates a very unstable performance, which is due to the continuous reactions of lithium with the liquid electrolyte.

Figure 4A:
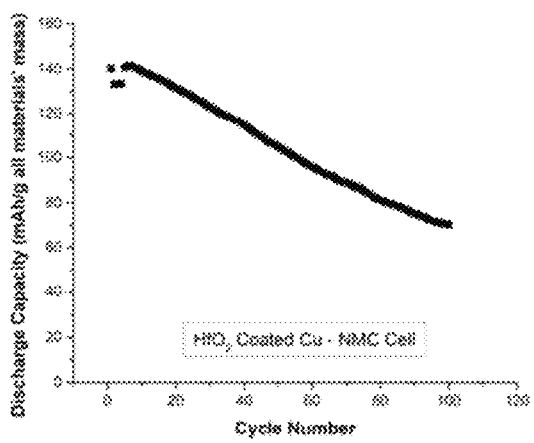
FIGS. 4A, 4B and 4C show charge-discharge performance of batteries with ~4.8 mAh/cm$^2$ LiNiMnCoO$_2$ (Ni:Mn:Co=8:1:1), represented by NMC811, and 7 nm HfO$_2$ coated Cu or bare Cu. The batteries were discharged at 0.33 C and charged at 0.1 C at 55° C. after the first three cycles at 0.1 C. These data are for Example 1. (a) Cycling performance of 7 nm HfO$_2$ coated Cu with NMC811 cathodes where the capacity is calculated based on the mass of all materials including copper anodes, electrolyte and separator. (b) Energy density and Coulombic efficiency of the cell with the 7 nm HfO$_2$ coated Cu anode with the NMC811 cathode. (c) Cycling performance of bare Cu with NMC811 cathodes.
Figure 4B:
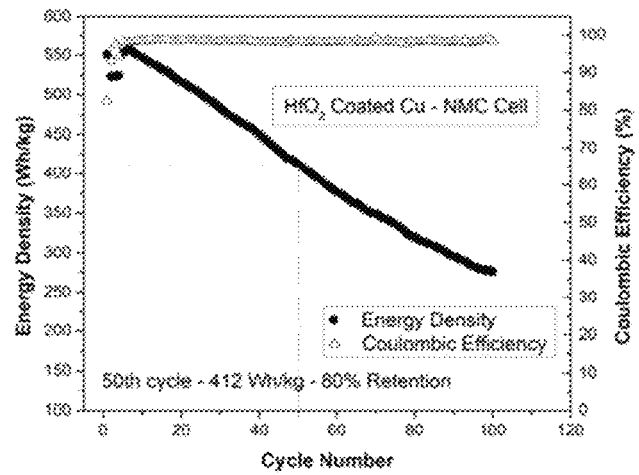
Figure 4C:
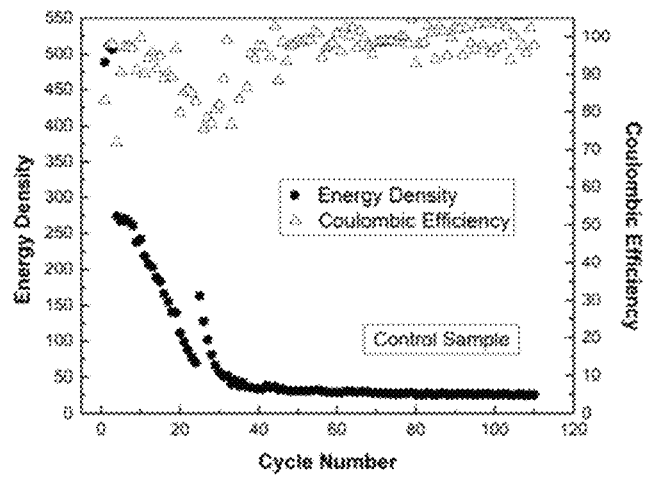

Performances of the $HfO_2$-coated Cu-metal anode and the bare Cu-metal anode paired with NMC811 cathodes were tested as follows in FIGS. 4A, 4B and 4C. As shown in FIG. 4A, the battery is charged and discharged in the first three cycles at 0.1 C, then 0.33 C was used for discharge and 0.1 C was used for charge in the following cycles. The battery of $HfO_2$-coated Cu (FIG. 4A) shows a very promising result and remained at 80% after about 50 cycles, as presented in FIG. 4B as well. From the energy density and Coulombic efficiency (CE) plotted in FIG. 4B, it is clear that with a very thin $HfO_2$ (~7 nm) coated on the copper, the energy density based on all materials' mass can reach over 500 Wh/kg. The CE is so stable and maintained at around 99.5%; while for the control sample where bare copper was used as the anode with NMC811, as shown in the FIG. 4C, the bare copper anode demonstrates a fast degradation rate and a very unstable performance for CE, which is due to the continuous reactions of lithium with the liquid electrolyte.

As for the 5 $mAh/cm^2$ NMC cathodes, around 25 microns of lithium stripped or plated upon each charge or discharge. The performance of the CE and energy density shown in FIG. 4B is very stable, suggesting that no lithium dendrites are presented on the anode surface. It is remarkable that only 7 nm $HfO_2$ coating by ALD can accommodate about 50 microns of lithium each cycle and it makes at least 100 cycles by suppressing well the dendrite formations.

It should be noted that such high energy density is achieved by NMC, calculated on the mass of electrodes and electrolyte excluding the coin cells' pack. It is expected that the present anode can be included in a battery with NMC811 or higher capacity cathodes, to achieve an energy density of 400 Wh/kg-500 Wh/kg based on cell level.

With a pouch cells testing comprising double-sided NMC811, or higher capacity cathodes in multiple layers, it is contemplated that the result can accomplish the energy density of over 600 Wh/kg based on materials' mass and realize 500 Wh/kg at cell level.

Example 2

In this example, a metal anode is made and included in Li-ion batteries (coin cells) having NMC as the cathode. The metal anode comprises a lithium metal layer and a protective coating comprising ultrapure ALD hafnium dioxide at a thickness of 8 nm. Batteries were made with these metal anodes, with a cathode of NMC811.

Figure 5A:
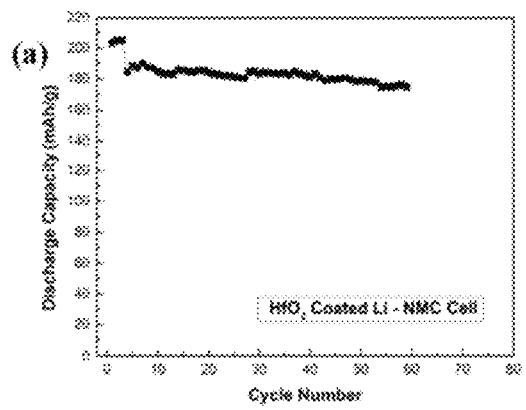
FIGS. 5A, 5B and 5C show the electrochemical performance of batteries of Example 2 with HfO$_2$-coated Li or with bare Li, where NMC811 is used as the cathodes.

As shown in FIG. 5A, the battery is charged and discharged in the first three cycles at 0.1 C, then 0.33 C was used for following cycles. The battery shows a very promising result by achieving 203 mAh/g based on the mass of the NMC811 mass and remained at 95% after about 60 cycles, demonstrating that the protected lithium is very stable with no sign of lithium dendrites formed during the process.

Figure 5B:
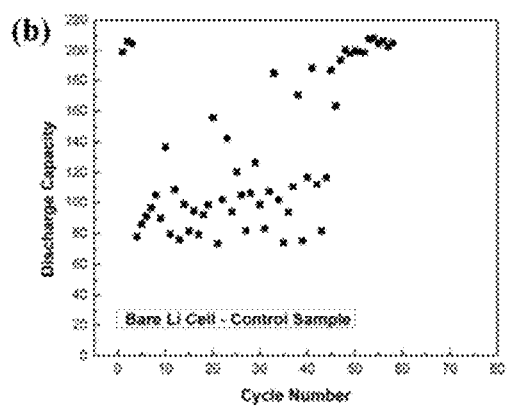
Figure 5C:
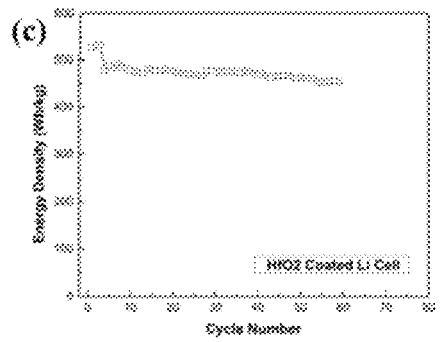

In comparison, bare lithium tested in batteries with NMC811 shows very unstable performance, demonstrated in FIG. 5B, which is because bare lithium is not stable in liquid electrolyte and forms a lot of side reactions. However, after certain cycles forming a thick SEI, the lithium seems to perform fine but finally the battery will fail because the dendrites consume all electrolytes or cause a short circuit by penetrating the separator. Based on the mass and the ratio of the electrodes as well as lithium as the anode, we calculated the energy density, presented in FIG. 5C for the full cell (Li|NMC811) based on the mass of the electrodes (the cathode and the anode). The energy density, as observed, reaches to 550 Wh/kg in the first three cycles at 0.1 C and retained at 480 Wh/kg after 60 cycles at 0.33 C. The cycling performance of the $HfO_2$-protected Li cell, even in a lean condition with only 15 μL electrolyte, shows remarkable results.

Figure 6:
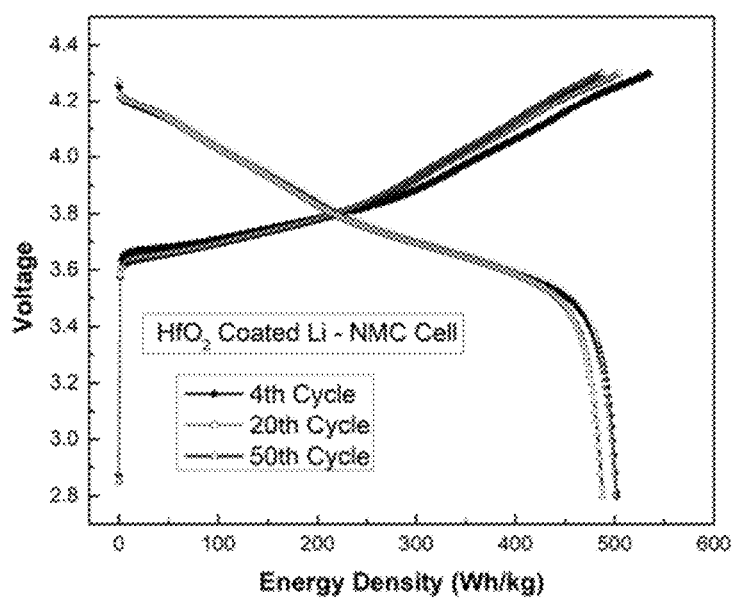
FIG. 6 shows voltage-energy density plots of the battery comprising 8 nm HfO$_2$ coated lithium from Example 2, with NMC811 cathodes in different cycles at 0.33 C.

The voltage and the energy density were evaluated changes during the cycles, as displayed in FIG. 6. The 4th cycle is the first cycle starting with 0.33 C, and it yields 502 Wh/kg. After 16 cycles, the 20th cycle and the 50th cycle degrades very small, demonstrating energy density of 500 Wh/kg and 482 Wh/kg, respectively. The remarkable stability of protected lithium compared to the bare lithium suggests that the ALD $HfO_2$ is a promising technology to enable the use of lithium metal anodes for ultrahigh energy batteries.

Example 3

Figure 9:
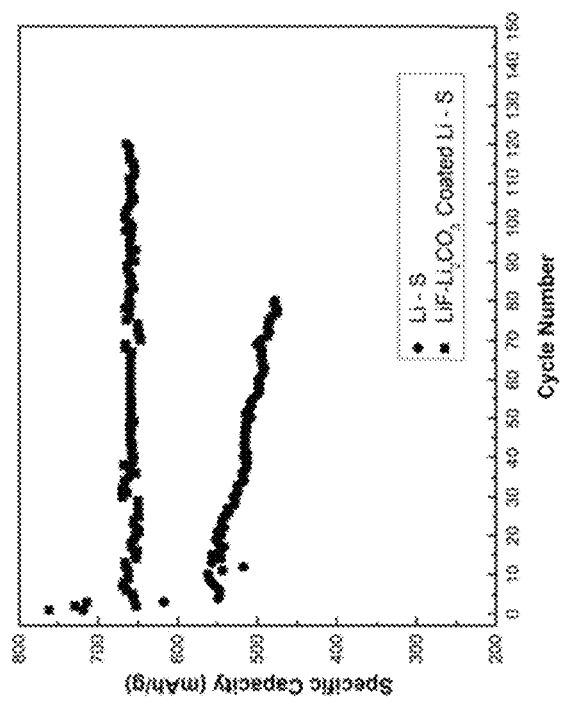
FIG. 9 shows the cycling performance of coin cells of Example 3, wherein the coin cells comprise ~2.5 mAh/cm$^2$ sulfur as the cathode and LiF—Li$_2$CO$_3$ composite coated lithium metal or bare lithium metal as the anode.

In this example, a coated Li-metal anode is made and evaluated in Li-ion coin cell batteries having sulfur as the cathode. The evaluated performance is shown in FIG. 9. The metal anode comprises a lithium metal layer and a protective coating comprising ultrapure ALD lithium fluoride well mixed lithium carbonate at a thickness of around 8 nm. A coated lithium anode was paired with a sulfur cathode in a 2325 coin cell. The sulfur cathode has a capacity of about 2.5 mAh/cm$^2$ and sulfur accounts for around 80% in the cathode materials. The diameter of circle electrodes are ⅝ inch with the ratio of electrolyte volume over sulfur mass equaling to 5.

The battery was charged and discharged in the first three cycles at 0.1 C, then 0.33 C was used for following cycles. The battery shows a promising result by achieving 650 mAh/g and nearly 100% even after 120 cycles, demonstrating that the protected lithium is very stable with no sign of lithium dendrites formed during the process and retains the capacity of lithium sulfur batteries well. In comparison, bare lithium tested in batteries with sulfur cathodes exhibited very poor performance (FIG. 9), which is attributed to instability of bare lithium in liquid electrolyte and formation of side reactions. Also, with cycles, the polysulfides continue to react on the lithium and this causes the corrosion of lithium metal.

Example 4

In this example, an ultrathin lithium metal anode is made and included in Li-ion coin cell battery having NMC811 as the cathode. The metal anode comprises a lithium metal layer on a copper substrate at a thickness of around 50 microns.

Figure 10:
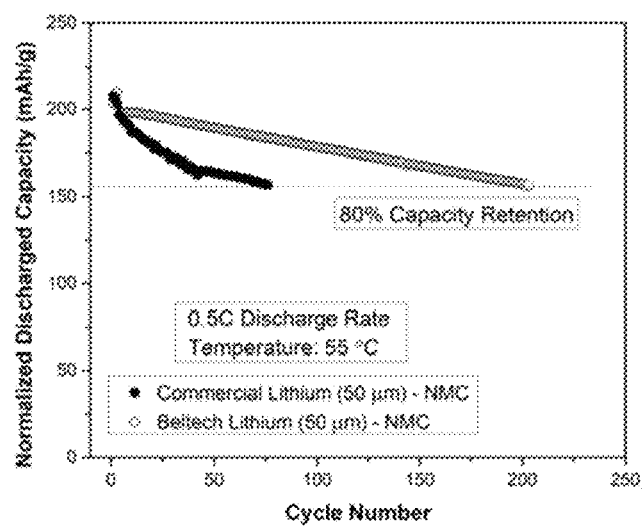
FIG. 10 shows the cycling performance of coin cells of Example 4, wherein the coin cells comprise ~2 mAh/cm$^2$ NMC811 as the cathode and unique ultrathin lithium metal made by Beltech or 50 microns commercial lithium metal made by mechanical press processes as the anode.

The lithium layer (i.e., Beltech Lithium in FIG. 10) was made by the unique process with treated copper substrates. It had a thickness of 50 microns. For comparison, a battery was also made with a commercially available, mechanically pressed lithium. As shown in FIG. 10, the battery is charged and discharged in the first three cycles at 0.1 C, then charged at 0.1 C and discharged at 0.5 C at 55° C. The lithium battery showed a very promising result by extending the cycle life of the lithium anode by over three times compared to the mechanically pressed lithium.

Figure 11A:
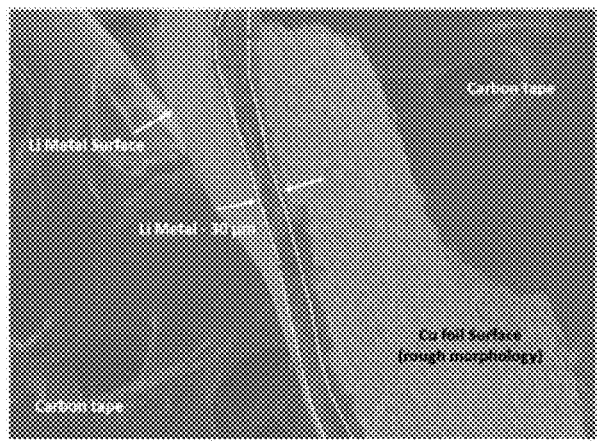
FIGS. 11A, 11B and 11C show scanning electron microscope (SEM) images of Example 4 for the unique ultrathin lithium metal made by the present inventor. The images show the thickness, the smoothness and cross-section of 30 microns lithium metal on copper foil.
Figure 11B:
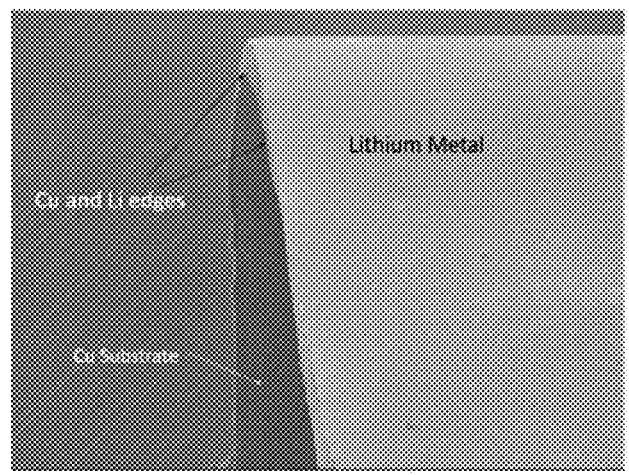
Figure 11C:
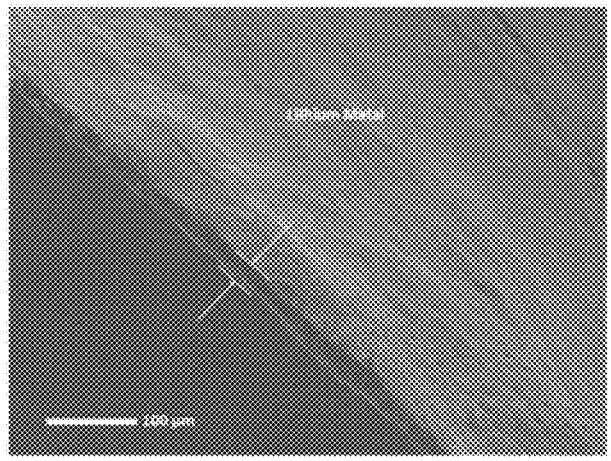

FIG. 11 shows SEM images of the Li-coated copper anodes prepared with the unique process and they show that we can make around 30 microns lithium metal on the copper substrate. The three images demonstrate that our unique process enables the thickness of 30 microns lithium, the great smoothness and excellent edges of the lithium metal on copper foil.

I claim:

1. A metal anode having a protective coating comprising:
a metal layer consisting of lithium, sodium, or potassium, wherein the metal layer has first major surface and a second major surface; and
a conformal protective coating on the first major surface of the metal layer, wherein the conformal protective coating comprises a composite material, wherein the composite material comprises; and
a current collector on the second major surface of the metal layer.

2. The metal anode of claim 1, wherein the composite material comprises (a) a lithium oxide-containing material when the metal layer comprises lithium; (b) a sodium oxide-containing material when the metal layer comprises sodium; or (c) a potassium oxide-containing material when the metal layer comprises potassium.

3. The metal anode of claim 2, wherein the composite material comprises (a) $Li_2O$—$Li_2CO_3$, $Li_2O$—LiF, $Li_2O$—$LiBF_4$, or any combination of these materials when the metal layer comprises lithium; (b) $Na_2O$—$Na_2CO_3$, $Na_2O$—NaF, $Na_2O$—$NaBF_4$, or any combination of these materials when the metal layer comprises sodium, and (c) $K_2O$—$K_2CO_3$, $K_2O$—KF, $K_2O$—$KBF_4$, or any combination of these materials when the metal layer comprises potassium.

4. A metal anode having a protective coating comprising:
a metal layer consisting of lithium, sodium, or potassium, wherein the metal layer has first and second major surfaces; and
a protective coating on the first major surface of the metal layer, wherein the protective coating comprises a composite material, wherein the composite material comprises $M_xHfO_2$, where X≥1 and M is Li, Na, K, or a mixture thereof, and
a current collector on the second major surface of the metal layer.

5. The metal anode of claim 4, wherein the metal layer of the metal anode has a thickness of 10 μm to 150 μm.

6. The metal anode of claim 4, wherein the protective coating has a thickness from 1 nm to 10 microns.

7. The metal anode of claim 4, wherein the protective coating is formed on the metal layer by atomic layer deposition, plasma enhanced atomic layer deposition, chemical vapor deposition, plasma enhanced chemical vapor deposition, sputtering, physical vapor deposition, spinning coating, dip coating, or pulsed laser deposition.

8. The metal anode of claim 1, wherein the composite material comprises lithium fluoride (LiF).

9. The metal anode of claim 8, wherein the composite material comprises LiF—$Li_2CO_3$.

10. The metal anode of claim 1, wherein the metal layer of the metal anode has a thickness of 10 μm to 150 μm.

11. The metal anode of claim 1, wherein the conformal protective coating has a thickness from 1 nm to 10 microns.

12. The metal anode of claim 1, wherein the conformal protective coating is formed on the metal layer by atomic layer deposition, plasma enhanced atomic layer deposition, chemical vapor deposition, plasma enhanced chemical vapor deposition, sputtering, physical vapor deposition, spinning coating, dip coating, or pulsed laser deposition.

13. The metal anode of claim 2, wherein the composite material comprises lithium carbonate ($Li_2CO_3$).

14. The metal anode of claim 1, wherein the composite material comprises lithium hexafluorophosphate ($LiPF_6$).

15. The metal anode of claim 1, wherein the composite material comprises lithium tetrafluoroborate ($LiBF_4$).

16. The metal anode of claim 1, wherein the conformal protective coating is formed on the metal layer by reacting or decomposing a first coating material precursor on the metal layer, and reacting or decomposing a second coating material precursor on the first coating material precursor.

17. The metal anode of claim 4, wherein the protective coating is formed on the metal layer by reacting or decomposing a first coating material precursor on the metal layer, and reacting or decomposing a second coating material precursor on the first coating material precursor.

18. The metal anode of claim 1, wherein the composite material further comprises lithium fluoride-lithium oxide (LiF—$Li_2O$), lithium fluoride-lithium carbonate (LiF—$Li_2CO_3$), lithium fluoride-lithium hexafluorophosphate (LiF—$LiPF_6$), lithium fluoride-lithium tetrafluoroborate (LiF—$LiBF_4$), $Li_2O$—$Li_2CO_3$, $Li_2O$—LiF, $Li_2O$—$LiBF_4$, LiF—$NbO_2$, $Li_3N$—AlN, $Li_xSi_3N_4$, $Li_xNb_3N_4$, where $X \geq 0$ or any combination of these materials.

19. The metal anode of claim 5, wherein the composite material further comprises MF-$M_2O$, MF-$M_2CO_3$, MF-$MPF_6$, MF-$MBF_4$, MF-$NbO_2$, $M_2O$-$M_2CO_3$, $M_2O$-$MBF_4$, $M_3N$—AlN, $M_3N$—AlN, $M_xSi_3N_4$, $M_xNb_3N_4$, or any combination thereof.

* * * * *